(12) United States Patent
Fukuhara et al.

(10) Patent No.: US 6,591,017 B1
(45) Date of Patent: Jul. 8, 2003

(54) WAVELET TRANSFORM METHOD AND APPARATUS

(75) Inventors: Takahiro Fukuhara, Kanagawa (JP); Seiji Kimura, Chiba (JP); Hitoshi Kiya, 5-9-3-307, Minami-Ohsawa, Hachioji-Shi, Tokyo (JP)

(73) Assignees: Sony Corporation, Tokyo (JP); Hitoshi Kiya, Tokyo (JP)

( * ) Notice: Subject to any disclaimer, the term of this patent is extended or adjusted under 35 U.S.C. 154(b) by 0 days.

(21) Appl. No.: 09/418,389

(22) Filed: Oct. 14, 1999

(30) Foreign Application Priority Data

Oct. 15, 1998  (JP) ............................................ 10-294031

(51) Int. Cl.⁷ .............................. G06K 9/36; G06K 9/32; G06K 9/54; H04N 7/12
(52) U.S. Cl. ....................... 382/240; 382/299; 382/302; 375/240.19
(58) Field of Search ................................. 380/240, 233; 375/240.08, 240.11, 240.19; 382/132, 232, 251, 298, 299, 302, 300, 240

(56) References Cited

U.S. PATENT DOCUMENTS 5,710,835 A * 1/1998 Bradley ...................... 382/233
5,835,129 A * 11/1998 Kumar ...................... 348/14.09

OTHER PUBLICATIONS

"The wavelet/Scalar Quantization Compression Standard for Digital Fingerprint Images," Bradley et al., 1994 IEEE internationa Symposium on Circuits and Systems, vol. 3, 1994, pp. 205–208.*

* cited by examiner

*Primary Examiner*—Wenpeng Chen
(74) *Attorney, Agent, or Firm*—Frommer Lawrence & Haug LLP; William S. Frommer; Darren M. Simon

(57) ABSTRACT

An image signal encoded for compression using a wavelet transform as a transform system is to be decoded at a resolution corresponding to an optional rational number. To this end, the wavelet decoding device includes an entropy decoding unit 1 for entropy decoding an encoded bitstream 100, a dequantizing unit for dequantizing the quantized coefficients 101 to transmit transform coefficients 102, a transform coefficient back-scanning unit 3 for scanning the transform coefficients 102 in a pre-set fashion to re-array the transform coefficients, and an inverse wavelet transform unit 4 for inverse transforming the re-arrayed transformation coefficients 103 to furnish a decoded image 104. The inverse wavelet transform unit 4 adaptively constitutes an upsampler, a downsampler and a synthesis filter in dependence upon a pre-set resolution conversion factor.

26 Claims, 19 Drawing Sheets

WAVELET TRANSFORM METHOD AND APPARATUS

BACKGROUND OF THE INVENTION

1. Field of the Invention

This invention relates to a waveform transform method and apparatus, that may be used in a system for efficient image transmission or storage. More particularly, it relates to a waveform transform method and apparatus in which decoding with optional rational number tuple resolution conversion is realized for an input bitstream encoded using wavelet transform encoding.

2. Description of the Related Art

In the conventional representative image compression system, there is a JPEG system (Joint Photographic Coding Experts Group) system, standardized by ISO (International Organization for Standardization). This system, which exploits DCT (discrete cosine transform) to compress and encode mainly a still image, is known to give satisfactory encoded and decoded images subject to allocation of a larger number of bits. However, if, with DCT, the number of bits for encoding is decreased beyond a certain value, block distortion proper to DCT becomes outstanding to render subjective deterioration apparent.

On the other band, investigations are proceeding briskly in an encoding system in which image signals are split into plural bands using a combination of high-pass filters and low-pass filters, termed a filter bank, and are encoded on the band basis. In particular, the wavelet encoding is retained to be promising as a new technique which takes the place of DCT because the new technique is free of a defect, proper to DCT, that block distortion becomes outstanding on higher compression.

Current video appliances, such as electronic still cameras or video movies, exploit JPEG or MPEG (Moving Picture Image Coding Experts Group) as the picture or image compression system, and DCT as the transform system. It is, however, premeditated that a product exploiting the transform system, which is based on the wavelet transform, will make its debut on the market.

However, there has not been presented an invention targeted at furnishing a product exploiting the feature of the wavelet transform, even although investigations towards improving the efficiency in the encoding system are going on energetically.

In the conventional wavelet transform and inverse transform, it is retained that, due to the properties of these transforms, resolution can be lowered or raised, by way of scaling, only in terms of powers of 2. It may, however, be premeditated that, if the resolution of an original image becomes higher, an increasing demand may be raised for decoding an image with a resolution other than powers of 2. That is, if decoding is possible with the resolution of optional rational number including powers of 2, limitations imposed by the terminal side become no longer decisive, thus leading to an appreciably enlarged field of application.

SUMMARY OF THE INVENTION

It is therefore an object of the present invention to provide a wavelet decoding method and apparatus in which image signals encoded for compression using the wavelet transform as the transform system can be decoded to a resolution of an optional rational number without being influenced by constraints imposed by the terminal side, as a result of which so-called thumb-nail images or images obtained on resolution conversion of an original image (contracted or enlarged image) frequently used in electronic still cameras or printers, can be stored or displayed efficiently to enlarge the field of application to a wide variety of products.

In one aspect, the present invention provides a entropy decoding means for entropy decoding an encoded bitstream to transmit quantized coefficients, dequantizing means for dequantizing the quantized coefficients to transmit transform coefficients, transform coefficient back-scanning means for scanning the transform coefficients in a pre-set fashion to re-array the transform coefficients, and inverse wavelet transform means for inverse transforming the re-arrayed transformation coefficients to furnish a decoded image. The inverse wavelet transform means adaptively constitute an upsampler, a downsampler and a synthesis filter in dependence upon a pre-set resolution conversion factor.

In another aspect, the present invention provides a entropy decoding means for entropy decoding an encoded bitstream to transmit quantized coefficients, dequantizing means for dequantizing the quantized coefficients to transmit transform coefficients, transform coefficient back-scanning means for scanning the transform coefficients in a pre-set fashion to re-array the transform coefficients, and inverse wavelet transform means for inverse transforming the re-arrayed transformation coefficients to furnish a decoded image. The inverse wavelet transform means converts the resolution of an inverse transformed image, higher in resolution than an image obtained with a pre-set resolution conversion factor, by the combination of a digital filter, a downsampler or an upsampler, taken singly or in combination.

In yet another aspect, the present invention provides a entropy decoding an encoded bitstream to transmit quantized coefficients, dequantizing the quantized coefficients to transmit transform coefficients, scanning the transform coefficients in a pre-set fashion to re-array the transform coefficients and inverse transforming the re-arrayed transformation coefficients to furnish a decoded image. In the inverse wavelet transform, the inverse wavelet transform means converts the resolution of an inverse transformed image, higher in resolution than an image obtained with a pre-set resolution conversion factor, by the combination of a digital filter, a downsampler or an upsampler, taken singly or in combination.

The upsampling has the effect of raising the resolution. Specifically, zero-value pixels are interpolated. On the other hand, downsampling has the effect of lowering the resolution. Specifically, sampling is effected every several pixels. The digital filtering, expressed by a suitable transfer function, performs processing every several pixels and multiplexes filter coefficients (impulse response) every pixel and executes convolution.

In the wavelet decoding device and method of the present invention, upsampling, downsampling and synthesis filtering are adaptively performed in inverse wavelet transform in dependence upon the pre-set resolution conversion factor and, on the downstream side of the inverse wavelet transform, upsampling and filtering for synthesis are carried out until a synthesized image of a pre-set enlarging factor is obtained. Also, in inverse wavelet transform, an inverse-transformed image having a resolution higher than that of the image obtained with a pre-set resolution conversion factor is resolution-converted by digital filtering, downsampling and upsampling, taken singly or in combination. In this manner, an image encoded for compression using a wavelet transform as the transform system can be decoded with a resolution a corresponding to an optional rational number, as a result of which a so-called thumbnail image used frequently in e.g., an electronic still camera or a printer, or an image resolution-converted from an original image (contracted or enlarged image) can be stored or displayed efficiently, thus enabling the application to various products to be expanded appreciably.

That is, according to the present invention, in which a band image eventually stored in an image memory can be displayed as a thumbnail image or a contracted image on a screen, if the process of generating a band-split image and the encoding process are designed as a common process, the processing can be improved in efficiency. Therefore, it is unnecessary to provide a particular circuit for generating a thumbnail image, thus reducing the hardware scale. Moreover, if an external storage device, for example, is annexed to the present device for storage and holding of the encoded bitstream, encoded bitstreams of a large number of images can be stored and held in the external storage device. Also, since the thumbnail images or contracted images need not perpetually be stored and held on the image memory, it suffices if the encoded bitstream of the thumbnail image or the contracted image desired to be viewed is incidentally read out, decoded and displayed on the screen, thus improving the utilization efficiency.

DESCRIPTION OF THE PREFERRED EMBODIMENTS

Figure 1:
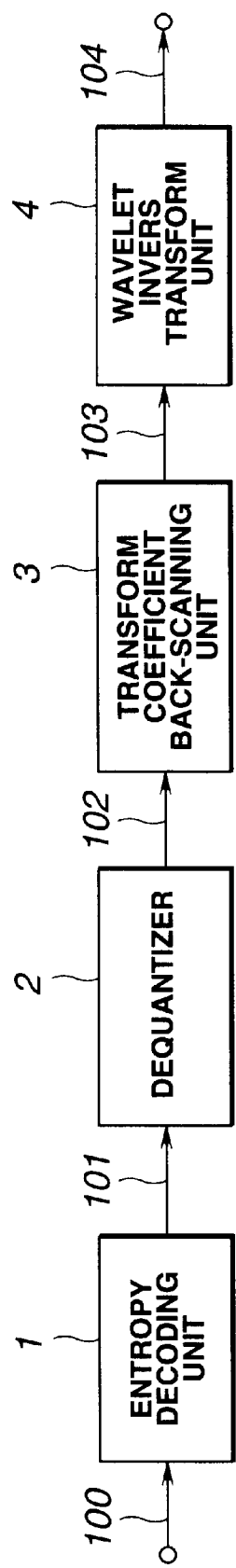
FIG. 1 is a block circuit diagram showing the entire structure of a wavelet decoding device embodying the present invention.

Referring to the drawings, preferred embodiments of the present invention will be explained in detail.

The preferred embodiment is suited for a system for efficient image transmission or storage. In particular, it realizes a wavelet decoding method and apparatus for decoding an input bitstream encoded using wavelet transform encoding with a resolution conversion with a factor of an optional rational number. Examples of specified fields of application include compression or expansion units for an electronic camera, portable and mobile image transmitting and/or receiving terminals (PDA), printers, satellite images, medical images, or software modules thereof, games, expansion units of textures used for three-dimensional CG, and software modules thereof.

FIG. 1 shows an entire structure of a wavelet decoding device of an embodiment to which are applied the decoding method and apparatus of the present invention.

A wavelet decoding device, embodying the present invention, shown in FIG. 1, includes an entropy decoding unit 1, for entropy decoding an encoded bitstream 100, a dequantizer 2 for dequantizing quantization coefficients 101 to send out transformation coefficients 102, a transformation coefficient back-scanning unit 3 for scanning the transformation coefficients 102 in a pre-set fashion and for sending out the resulting re-arrayed transformation coefficients 103, and an inverse wavelet transform unit 4 for inverse-transforming the re-arrayed transformation coefficients 103 to furnish a decoded image 104.

More specifically, the entropy decoding unit 1 performs pre-set entropy decoding on the encoded bitstream 100 sent out from the wavelet encoding device or module. As the entropy decoding, Huffmann encoding or arithmetic decoding, routinely used, may be employed. As a matter of course, it is necessary to use a technique which is a counterpart of the entropy encoding processing used in the wavelet encoding device.

The dequantizer 2 dequantizes the output quantization coefficients 101, decoded by the entropy decoding unit 1, to output transformation coefficients 102. Meanwhile, the dequantizer 2 needs to be a counterpart device of the quantizer used in the wavelet encoding device.

The transformation coefficient back-scanning unit 3 re-arrays the transformation coefficients 102, obtained in the dequantizer 2, to output new transformation coefficients 103. The back-scanning method is the reverse operation of the scanning processing used in the wavelet encoding device.

The inverse wavelet transform unit 4 inverse-transforms the new transformation coefficients 103 to furnish ultimate decoded image signals 104.

In the present wavelet decoding device, an up-sampler, a down-sampler and a synthesis filter are adaptively arranged in the inverse wavelet transform unit 4 to realize the function of resolution conversion by a factor of an optional rational number.

Before proceeding to the detailed description of the structure and the operation for resolution conversion processing in the present wavelet decoding device by the factor of the optional rational number, the structure and the operation for the routine wavelet transform processing and for the inverse wavelet transform processing are explained with reference to FIGS. 2 to 6.

Figure 2:
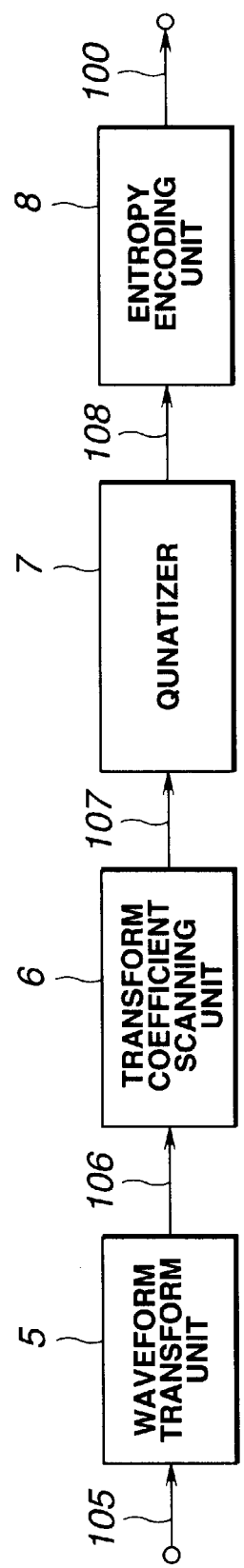
FIG. 2 is a block circuit diagram showing the entire structure of a wavelet encoding device which is a counterpart of the wavelet decoding device embodying the present invention.

FIG. 2 shows the basic structure of the routine wavelet encoding device.

The wavelet encoding device, shown in FIG. 2, includes a wavelet transform unit 5, a transformation coefficient back-scanning unit 6, a quantizer 7 and an entropy encoding unit 8, as its basic constituents.

The wavelet transform unit 5 wavelet-transforms an input image signal 105 to output resulting transformation coefficients 106.

The transformation coefficient back-scanning unit 6 re-arrays the transformation coefficients 6 from the wavelet transform unit 5 to output new transformation coefficients 107. Meanwhile, the scanning by the transformation coefficient back-scanning unit 3 is the re-arraying processing which is the reverse of the scanning performed by the transformation coefficient scanning unit 6.

The quantizer 7 quantizes the transformation coefficients 107 furnished by the transformation coefficient scanning unit 6 to output quantization conventional 108. Meanwhile, the processing in the dequantizer 2 of FIG. 1 is the reverse of the processing performed by the quantizer 7.

The entropy encoding unit 8 performs pre-set entropy coding on the quantization coefficients 108 furnished by the quantizer 107 to output an encoded bitstream 100. For this entropy coding, the Huffmann encoding or arithmetic coding, routinely employed, may be used. The processing in the entropy decoding unit 1 in FIG. 1 is the counterpart of the processing performed in the entropy encoding unit 8.

Figure 3:
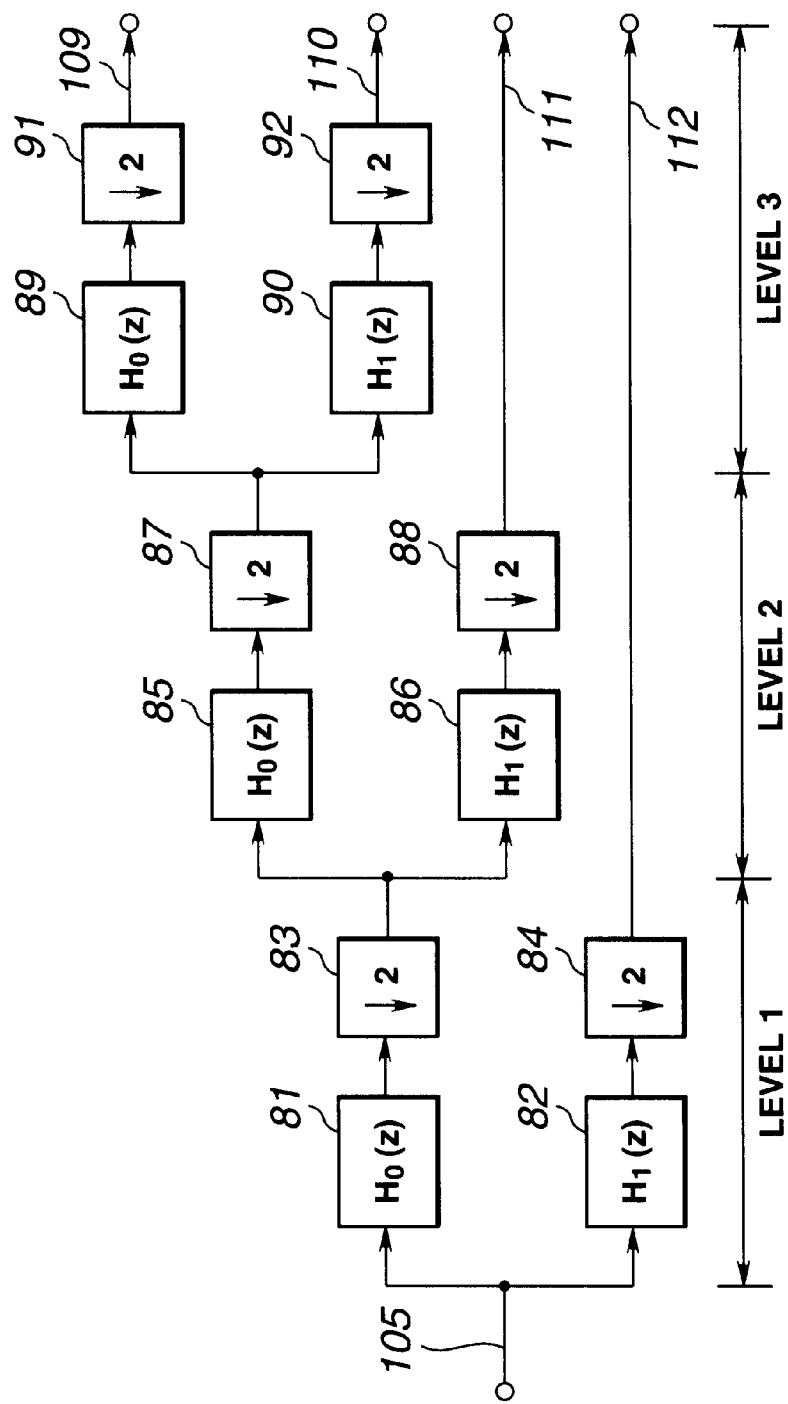
FIG. 3 is a block circuit diagram showing the basic structure, up to the level 3, of the routine wavelet transform unit.

FIG. 3 shows a structure for performing routine wavelet transform processing. Specifically, FIG. 3 shows an illustrative structure in which octave splitting, which is the most popular wavelet transform processing amongst plural relevant techniques, is performed over plural levels. In the case of FIG. 3, the number of levels is 3 (level 1 to level 3). The image signals are split into a low range and a high range and only signals of the low range are hierarchically split. Although FIG. 3 shows wavelet transform processing for one-dimensional signals, such as horizontal components of an image, by way of an example, the processing can be extended to two-dimensional signals to cope with two-dimensional image signals.

In FIG. 3, the input signal 105 is split by a low-pass filter for analysis 81 and a high-pass filter for analysis 82. The resulting low-range and high-range signals are decomated in resolution to one-half resolution by associated downsamplers 83, 84, respectively (level 1).

The low-range signals from signals of the downsamplers 83, 84 are further band-split by a low-pass filter for analysis 85 and a high-pass filter for analysis 86. The signals from this band-splitting are passed through downsamplers 87, 88 where the signals are decimated to ½ tuple resolution (level 2).

Of the output signals of the downsamplers 87, 88, the low-range signals are further band-split by a low-pass filter for analysis 89 and a high-pass filter for analysis 90. The band-split signals are decimated by downsamplers 91, 92, where the signals are decimated to ½ tuple resolution (level 3).

By performing this processing to a pre-set level, signals of respective bands, obtained on band-splitting the low-range signals, are sequentially generated. In the embodiment of FIG. 3, LLL signals 109, LLH signals 110, LH signals 111 and H signals 112 are generated as a result of band splitting up to the level 3. It is noted that L in the LLL signals denotes low-range components, whereas H denotes high-range components.

Figure 4:
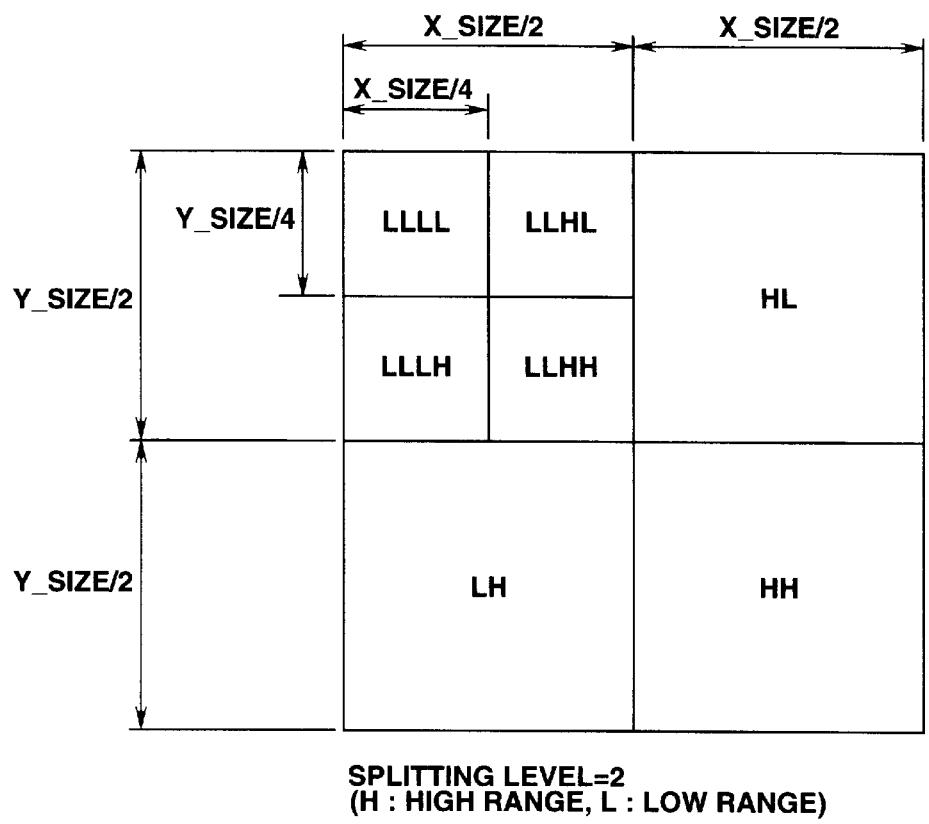
FIG. 4 is a diagrammatic view showing band splitting of a two-dimensional image, with the splitting level of 2.

FIG. 4 shows band components obtained as a result of band splitting of two-dimensional images up to the level 2. It is noted that the nomenclature for L and H in FIG. 4 differs from that in FIG. 3 showing one-dimensional signals. That is, LL in FIG. 4 indicates that both the horizontal and vertical components are L (low range), whereas LH in FIG. 4 indicates that the horizontal component is H (high component) and the vertical component id L (low range). In FIG. 4, X_SIZE and Y_SIZE indicate the resolution in the vertical direction (X-direction) and that in the horizontal direction (Y-direction), respectively.

That is, in FIG. 4, the two-dimensional original image is first split by the level 1 band splitting (splitting in the horizontal direction and in the vertical direction) into four components LL, LH, HL and HH. The LL component then is further split by the level 2 band splitting (splitting in the horizontal direction and in the vertical direction) into four components LLLL, LLHL, LLLH and LLHH.

Figure 5:
FIG. 5 shows images of various bands obtained on band-splitting an actual image with the splitting level equal to 3.

FIG. 5 shows an image example in case the image splitting of FIG. 4 is applied to an actual image. As may be seen from FIG. 5, the major portion of the image information is contained in the low-frequency components.

Figure 6:
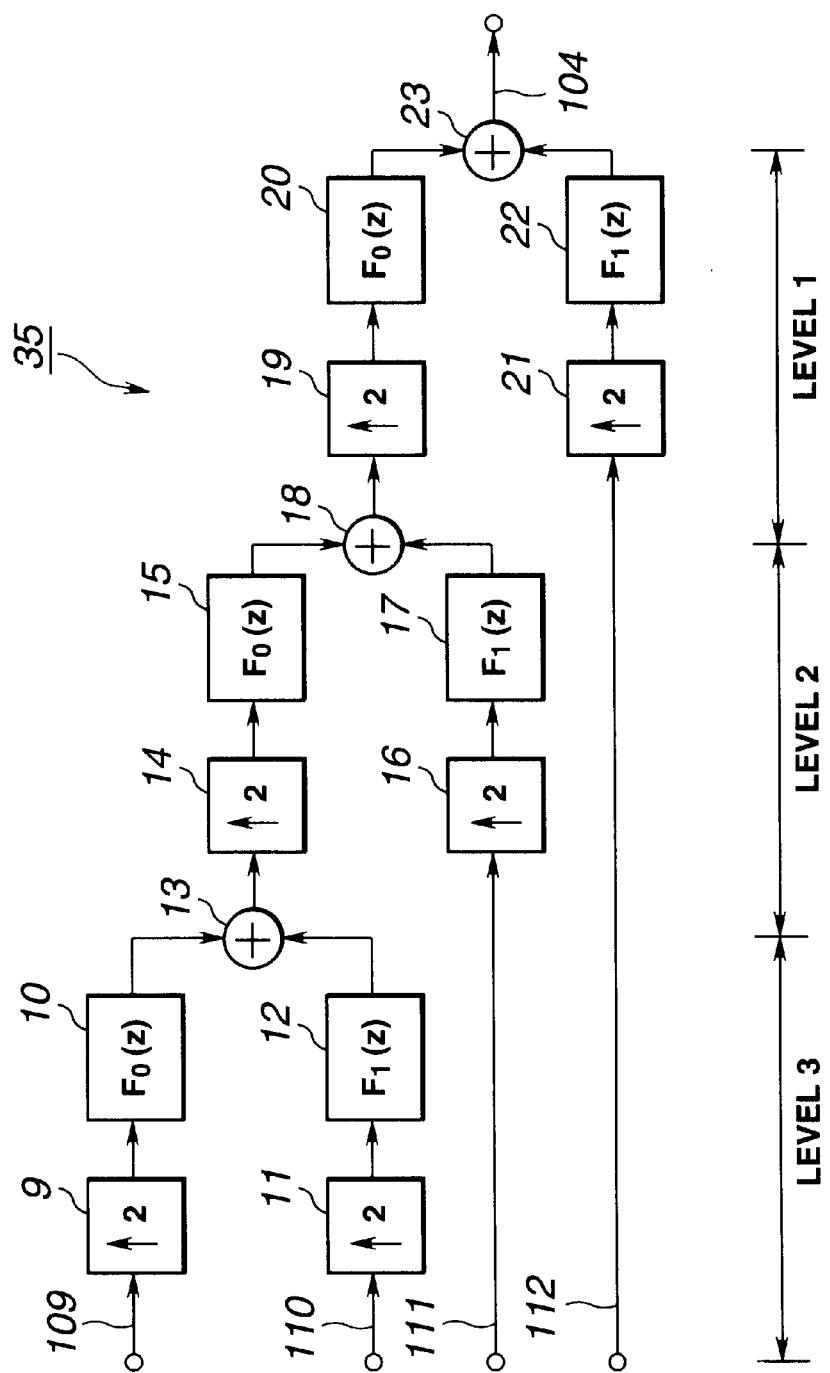
FIG. 6 is a block circuit diagram showing the basic structure, up to the level 3, of a routine inverse wavelet transform unit.

FIG. 6 shows a structure for routine inverse wavelet transform processing without the resolution converson. In the following description, the constituent portions of FIG. 6 in their entirety are termed a basic inverse wavelet transform structure 35.

If the respective band components (LLL signal 109, LLH signal 110, LH signal 111 and H signal 112), outputted by the wavelet transform unit, explained with reference to FIG. 3, are inputted to the basic inverse wavelet transform structure 35, the LLL signal 109 and the LLH signal 110 are up-sampled to the twofold resolution by upsamplers 9, 11, respectively.

The signal generated on upsampling the LLL signal 109 by the upsampler 9 is filtered by low-pass filter for synthesis 10 and thence sent to an adder 13. The signal generated on upsampling the LLH signal 110 by the upsampler 11 is filtered by a high-pass filter for synthesis 12 and thence sent to an adder 13.

The adder 13 band-synthesizes the two signals. The above processing completes the inverse transform of the level 3.

The above processing is repeated in similar fashion up to the level 1 to output an ultimate inverse-transformed decoded image 104

That is, an output signal of the adder 13 is further upsampled by an upsampler 16 and filtered by a low-pass filter for synthesis 15. The filtered signal is routed to an adder 18.

The LH signal 111 is upsampled by an upsampler to twofold resolution and subsequently sent to the adder 18 after filtering by the high-pass filter for synthesis 17.

The adder 18 band-synthesizes the two signals from the low-pass filter for synthesis 15 and the high-pass filter for synthesis 17. The above processing completes the inverse wavelet transform of the level 2.

An output signal of the adder 18 is further upsampled by an upsampler 19 to twofold resolution and filtered by a low-pass filter for synthesis 20. The filtered signal then is sent to an adder 23.

The H signal 112 is upsampled by an upsampler 21 to twofold resolution and filtered by a high-pass filter for synthesis 22. The filtered signal then is sent to an adder 23.

The adder 23 synthesizes both signals from the low-pass filter for synthesis 20 and the high-pass filter for synthesis 22. The above processing completes the inverse wavelet transform of the level 1.

Based on the basic structure and operation of the wavelet encoding and decoding, described above, the wavelet decoding device, provided with the resolution conversion function by a factor of an optional rational number, is hereinafter explained.

The wavelet decoding device according to a first embodiment of the present invention is now explained.

In the preferred embodiment, the inverse wavelet transform unit 4 of the wavelet decoding device, shown in FIG. 1, is of such a structure in which only low-range signals of a pre-set level are decoded in keeping with the resolution reduction or lowering. Stated differently, the inverse wavelet transform unit 4 of the first embodiment omits the structure of decoding high-range side signals at the pre-set level from the structure of FIG. 6 in keeping with the reduction ratio.

Figure 7:
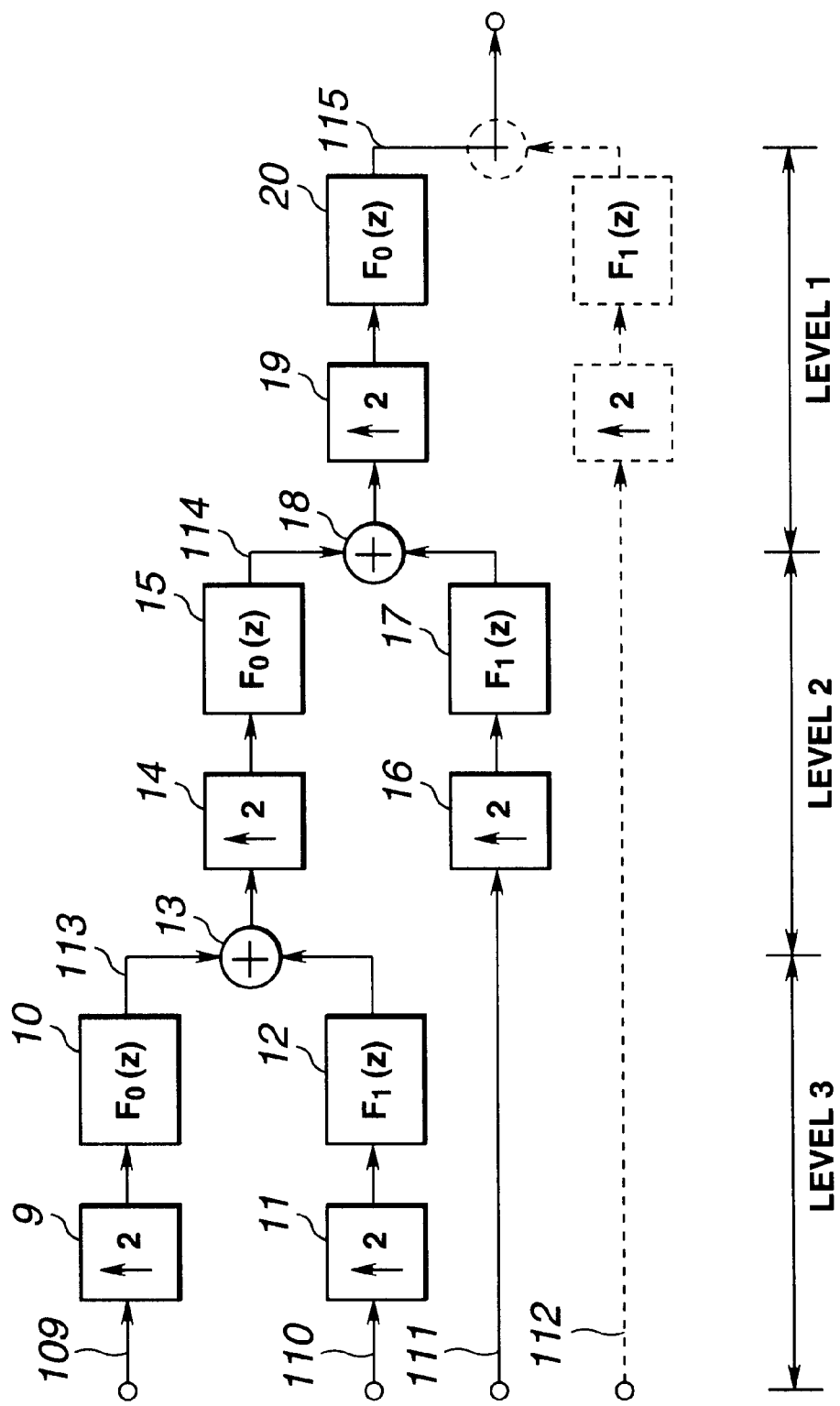
FIG. 7 is a block circuit diagram showing an inverse wavelet transform unit with resolution conversion with a factor equal to the reciprocal of powers of 2, as a first embodiment.

FIG. 7 schematically shows the structure of the wavelet decoding device for decoding the image contracted by a factor of reciprocals of powers of 2. FIG. 7 shows a schematic structure of a wavelet transform device for decoding a contracted image of a size one-half the size of the original image, as typical of a contracted image with a size equal to a reciprocal of the power of 2 of the original image. In the structure of FIG. 7, the same constituent parts as those of FIG. 6 are denoted by the same reference numerals as those used in FIG. 6. The high-range side path, indicated by a broken line in FIG. 7, is omitted in the structure of FIG. 7, although it is provided in the routine wavelet decoding device shown in FIG. 6.

As may be seen from above, the signal upsampled by a factor of two by the upsampler 9 and then passed through the low-pass filter for synthesis 10 for the level 3 corresponds to an image contracted to a size of one-fourth of the original image. It may similarly be seen that a signal 114 outputted by the low-pass filter for synthesis 15 for the level 2 corresponds to an image contracted to a one-half size of the original image. Thus, it may be seen that, for obtaining an image contracted to the size of, for example, one-fourth of the original image, it suffices to take an output signal of the low-pass filter for synthesis 10, and that, for obtaining an image contracted to, for example, one-half size of the original image, it suffices to take an output signal of the low-pass filter for synthesis 15. In this case, the H-signal is not needed in decoding ¼ contracted image nor in decoding one-half contracted image. Thus, in the present first embodiment, the structure for decoding the high-range side signal for the level 1 is omitted, as shown in FIG. 6, in order to generate a decoded image signal 115 contracted to a size equal to reciprocals of the powers of 2 of the original image.

That is, in the inverse wavelet transform unit 4 of the present first embodiment, shown in FIG. 7, the LLL signal 109 and the LLH signal 110 are upsampled by the upsamplers 9, 11 to double resolution and filtered by the associated low-pass filter for synthesis 10 and high-pass filter for synthesis 12, respectively. The two signals then are band-synthesized in the adder 13. The above processing completes the inverse transform for the level 3.

An output signal of the adder 13 is upsampled to a twofold resolution by the upsampler 14 and filtered by the low-pass filter for synthesis 15 so as to be then supplied to an adder 18.

The LH signal 111 is upsampled to the twofold resolution by the upsampler 14 and filtered by the high-pass filter for synthesis 17 so as to be then supplied to the adder 18.

The adder 18 band-synthesizes the two signals from the low-pass filter for synthesis 15 and the high-pass filter for synthesis 17. The above processing completes the inverse transform for the level 2.

An output signal of the adder 18 is upsampled to a twofold resolution by the upsampler 19 and filtered by the low-pass filter for synthesis 20.

In the structure of FIG. 7, an output image signal 115 of the low-pass filter for synthesis 20 is outputted as a decoded image signal of a contracted image of a one-half size by the wavelet decoding device of the first embodiment.

A wavelet decoding device of a second embodiment of the present invention is hereinafter explained.

In the present second embodiment, the structure for decoding high-range signals of the pre-set level is omitted, or deleted, from the structure of FIG. 6, in agreement with the contraction ratio for resolution reduction. In addition, the resolution of the high-range components of the omitted decoding structure is set so as to be less than or equal to the resolution as set by the contraction ratio. Also, a downsampler is arranged at the ultimate stage to decimate the decoded image to furnish the ultimate decoded image.

Figure 8:
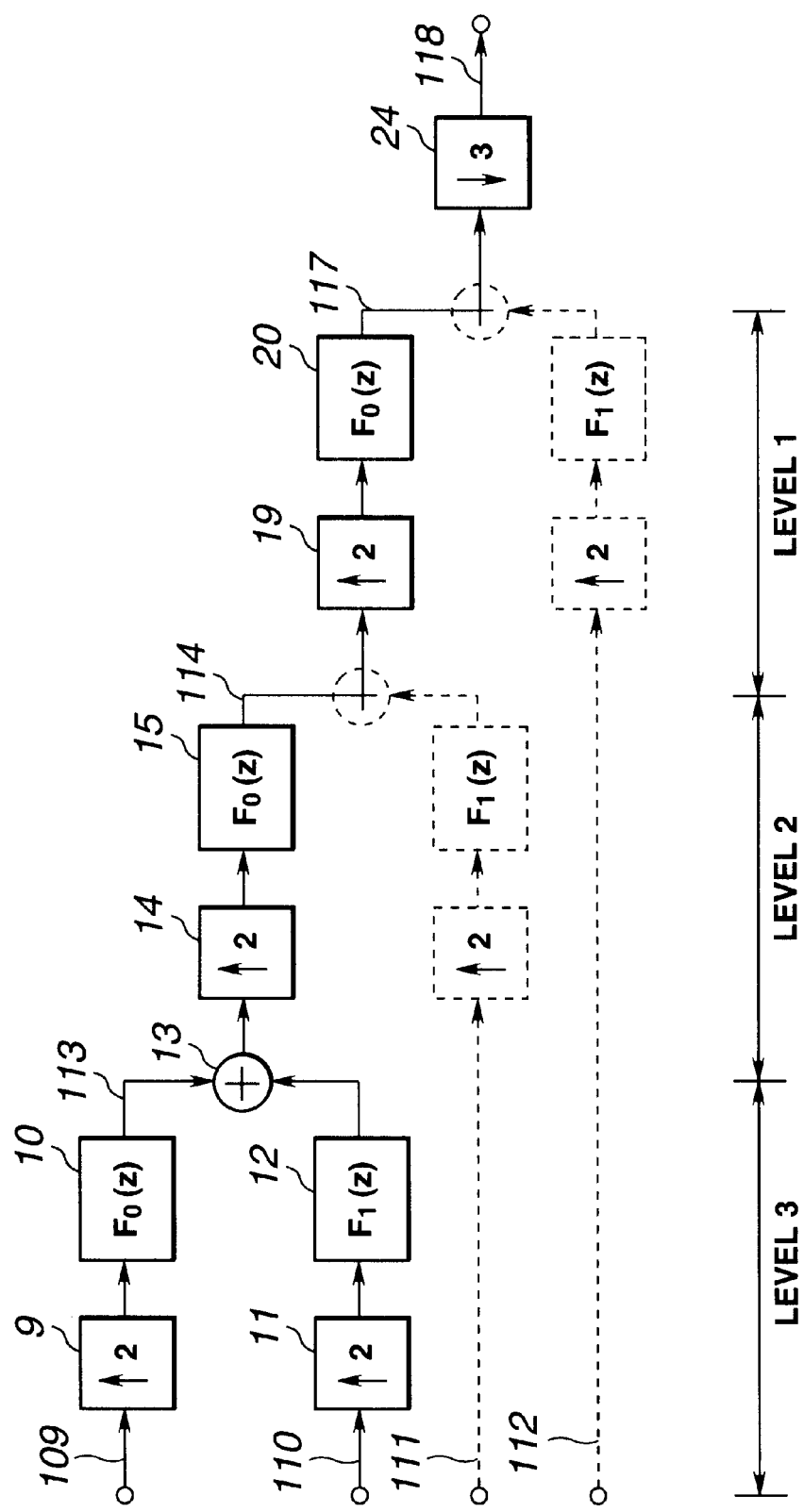
FIG. 8 is a block circuit diagram showing an inverse wavelet transform unit with resolution conversion with a factor equal to one-third, as a second embodiment.

FIG. 8 schematically shows, as the second embodiment, the structure of the inverse wavelet transform unit 4 in case of decoding a contracted image the size of one-third the original image by the wavelet decoding device of FIG. 1. In the structure of FIG. 8, the same constituent parts as those of FIG. 7 are denoted by the same reference numerals as those used in FIG. 7. The high-range side paths, indicated by broken lines in FIG. 8, are omitted in the structure of FIG. 8, although it is provided in the routine wavelet decoding device shown in FIG. 6.

As mentioned in the first embodiment, described above, a signal 113, outputted by the low-pass filter for synthesis 10 for the level 3, corresponds to an image contracted to one-fourth of the original image, whereas a signal 114, outputted by the low-pass filter for synthesis 15 for the level 2, corresponds to an image contracted to one-half of the original image. Thus, it may be seen that, if the relation one-half reduction ratio>one-third reduction ratio >one-fourth reduction ratio is used, neither the band components of the H signal 112 for generating the image of the same resolution as the original image nor the band components of the LH signal 111 for generating the image having one-half resolution are necessary if only one-third band components are needed.

In light of the foregoing, in the present second embodiment, the structure for decoding the level 1 high-range side signals and that for decoding the level 2 high-range side signals, shown in FIG. 6, are omitted, in order to generate a decoded image signal 118 of a contracted image of the size of one-third of the original image, whilst a ⅓ downsampler 24 is provided in the ultimate stage.

That is, in the inverse wavelet transform unit 4 of the second embodiment, shown in FIG. 8, the LLL signal 109 and the LLH signal 110 are upsampled to the twofold resolution by the upsamplers 9, 11 and filtered by associated low-pass filter for synthesis 10 and high-pass filter for synthesis 12. The two resulting signals are band-synthesized by the adder 13. The above processing completes the inverse transform for the level 3.

An output signal of the adder 13 is upsampled to a twofold resolution by the upsampler 14 and subsequently filtered by the low-pass filter for synthesis 15. The resulting signal is further upsampled to the twofold resolution by the upsampler 19 and subsequently filtered by the low-pass filter for synthesis 20.

A signal 117 from the low-pass filter for synthesis 20 is downsampled, that is decimated, by ⅓ by a downsampler 24.

In the present second embodiment, an output signal 118 of the downsampler 24 is outputted as the decoded image signal of the one-third-sized contracted image.

In the present second embodiment, not only can a decoded image of the ⅓ contracted image be produced, but also a two-fold upsampler and a high-pass filter for synthesis for the H signal 112 and a two-fold upsampler and a high-pass filter for synthesis for the LH signal 111 are both unneeded to enable reduction of the calculation volume and reduction of the size of the circuit structure.

Also, since neither the high-range signals with one-half resolution nor the high-range components having the same resolution as that of the original image are synthesized into the decoded image signal 118 obtained by the wavelet decoding device of the present second embodiment, there is no risk of generation of noise, such as aliasing.

A wavelet decoding device according to a third embodiment of the present invention is now explained.

In the present third embodiment, similarly to the above-described second embodiment, the structure for decoding high-range signals of the pre-set level is omitted, from the structure of FIG. 6, in agreement with the contraction ratio for resolution reduction. In addition, the resolution of the high-range components of the omitted decoding structure is set so as to be less than or equal to the resolution as set by the contraction ratio. Also, a downsampler is arranged at the ultimate stage to decimate the decoded image to furnish an ultimate decoded image.

Figure 9:
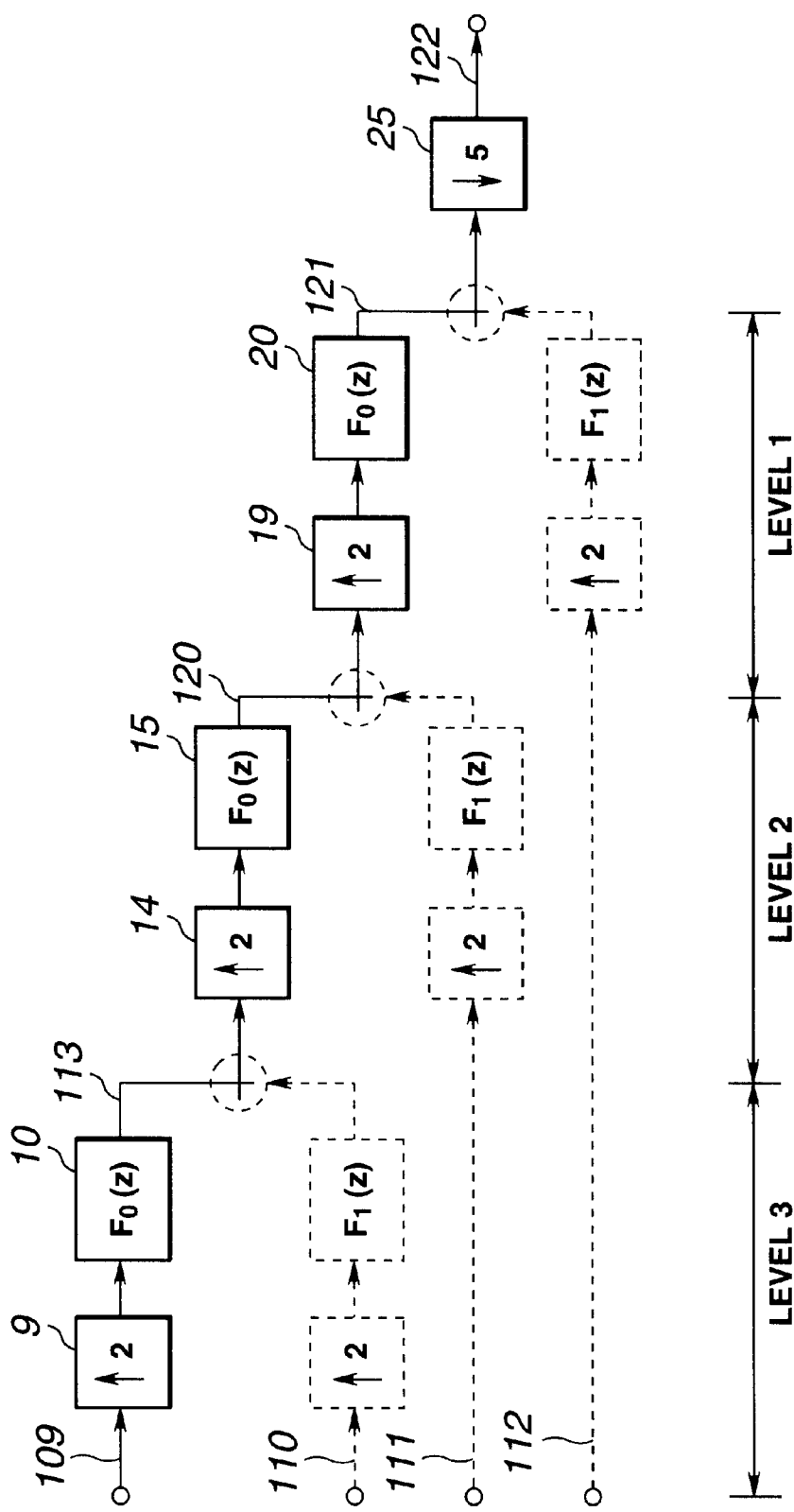
FIG. 9 is a block circuit diagram showing an inverse wavelet transform unit with resolution conversion with a factor equal to one-fifth, as a third embodiment.

FIG. 9 schematically shows, as the third embodiment, the structure of the inverse wavelet transform unit 4 in case of decoding a contracted image the size of one-fifth the original image by the wavelet decoding device of FIG. 1. In the structure of FIG. 9, the same constituent parts as those of FIGS. 7 and 8 are denoted by the same reference numerals as those used in FIGS. 7 and 8. The high-range side paths, indicated by broken lines in FIG. 9, represent omitted paths in the wavelet decoding device of the preferred embodiment, although these paths are provided in the routine wavelet decoding device shown in FIG. 6.

As mentioned in the first embodiment, described above, a signal 113, outputted by the low-pass filter for synthesis 10 for the level 3, corresponds to an image contracted to one-fourth of the original image, whereas a signal 120, outputted by the low-pass filter for synthesis 15 for the level 2, corresponds to an image contracted to one-half of the original image. Thus, it may be seen that, if the relation one-fourth reduction ratio>one-fifth reduction ratio>one-eighth reduction ratio is used, none of the band components of the H signal 112 for generating the image of the same resolution as the original image, the band components of the LH signal 111 for generating the image having one-half resolution or the band components of the LLH signal 110 for generating the one-fourth resolution is necessary if only one-fifth band components are needed.

In light of the foregoing, in the present second embodiment, the structure for decoding the level 1 high-range side signals, that for decoding the level 2 high-range side signals, and that for decoding the level 2 high-range side signals shown in FIG. 6, are omitted, in order to generate a decoded image signal 122 of a contracted image of the size of one-fifth of the original image, whilst a ⅕ downsampler 24 is provided in the ultimate stage.

That is, in the inverse wavelet transform unit 4 of the third embodiment, shown in FIG. 8, the LLL signal 109 is upsampled to the twofold resolution by the upsampler 9 and filtered by the low-pass filter for synthesis 10. The resulting signal then is upsampled to twofold resolution and filtered by the low-pass filter for synthesis 15.

A signal 120, filtered by the low-pass filter for synthesis 15, is upsampled to a twofold resolution by the upsampler 19 and subsequently filtered by the low-pass filter for synthesis 20.

A signal 121, obtained on filtering by the low-pass filter for synthesis 20, is downsampled, that is decimated, to one-fifth by a downsampler 25.

In this third embodiment, the output signal 122 from the downsampler 25 is outputted as a decoded image signal of the one-fifth-sized contracted image.

In the present third embodiment, not only can a decoded image of the ⅕ contracted image be produced, but also a two-fold upsampler and a high-pass filter for synthesis for the H signal 112, a two-fold upsampler and a high-pass filter for synthesis for the LH signal 111 and a two-fold upsampler and a high-pass filter for synthesis for the LLH signal 110, are both unneeded, thus enabling reduction of the calculation volume and reduction of the size of the circuit structure.

Also, since the high-range signals with one-fifth resolution is not synthesized by the previous-stage processing into the decoded image signal 118 obtained by the wavelet decoding device of the present third embodiment, there is no risk of generation of noise, such as aliasing.

A wavelet decoding device according to a fourth embodiment of the present invention is hereinafter explained.

In the present fourth embodiment, the inverse wavelet transform unit 4 of the wavelet decoding device, shown in FIG. 1, is constructed so that an upsampler and a synthesis filter are arranged downstream of the basic inverse wavelet transform structure 35 to generate a resolution-converted image, and a downsampler is arranged in the downstream side ultimate stage to decimate the decoded image to furnish an ultimate decoded image. The upsampler doubles the resolution in the longitudinal or transverse direction and is paired with the synthesis filter.

Figure 10:
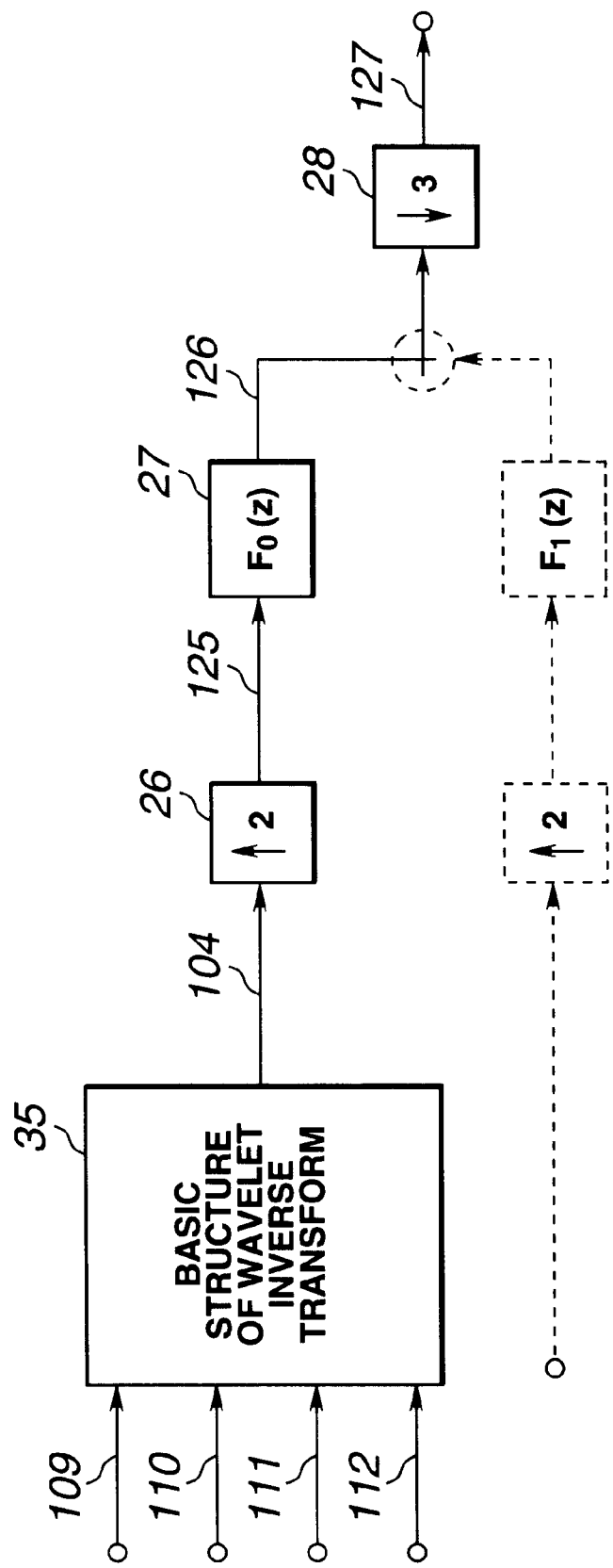
FIG. 10 is a block circuit diagram showing an inverse wavelet transform unit with resolution conversion with a factor equal to two-thirds, as a fourth embodiment.

FIG. 10 schematically shows, as the fourth embodiment, the structure of the inverse wavelet transform unit 4 in case of decoding a contracted image the size of two-third the original image by the wavelet decoding device of FIG. 1. In the structure of FIG. 10, the same constituent parts as those of FIG. 6 are denoted by the same reference numerals as those used in FIG. 6. The high-range side paths, indicated by broken lines in FIG. 10, represent omitted paths in the wavelet decoding device of the preferred embodiment, although these paths provided in the routine wavelet decoding device shown in FIG. 6.

In the inverse wavelet transform unit 4, shown in FIG. 10, the inverse transformed decoded image signal 104, outputted by the basic inverse wavelet transform structure 35, is upsampled to twofold resolution by the doubling upsampler 26, to form a decoded image signal 125 of the double resolution. The decoded image signal 125 of the twofold resolution is further filtered y a low-pass filter for synthesis 27 to produce a decoded image signal 126.

This decoded image signal 126 is decimated by the one-third downsampler 28 in the ultimate stage. This outputs a decoded image signal 127 of two-third resolution.

Meanwhile, in the present fourth embodiment, the structure shown in FIG. 7 may be used, in place of the structure shown in FIG. 6, for the basic inverse wavelet transform structure 35. In particular, it is preferred that, if the reducing factor is close to 1, the basic inverse wavelet transform structure 35, having the structure of FIG. 6, is used, and that, if the reducing factor is deviated from 1 and closer to ½, the structure of FIG. 7 is used.

A wavelet decoding device according to a fifth embodiment of the present invention is hereinafter explained.

In the present fifth embodiment, the inverse wavelet transform unit 4 of the wavelet decoding device, shown in FIG. 1, includes an upsampler and a synthesis filter on a downstream side of the basic inverse wavelet transform structure 35 to realize a synthesized image of a pre-set enlarging ratio. The upsampler doubles the resolution in the longitudinal direction or in the transverse direction.

Figure 11:
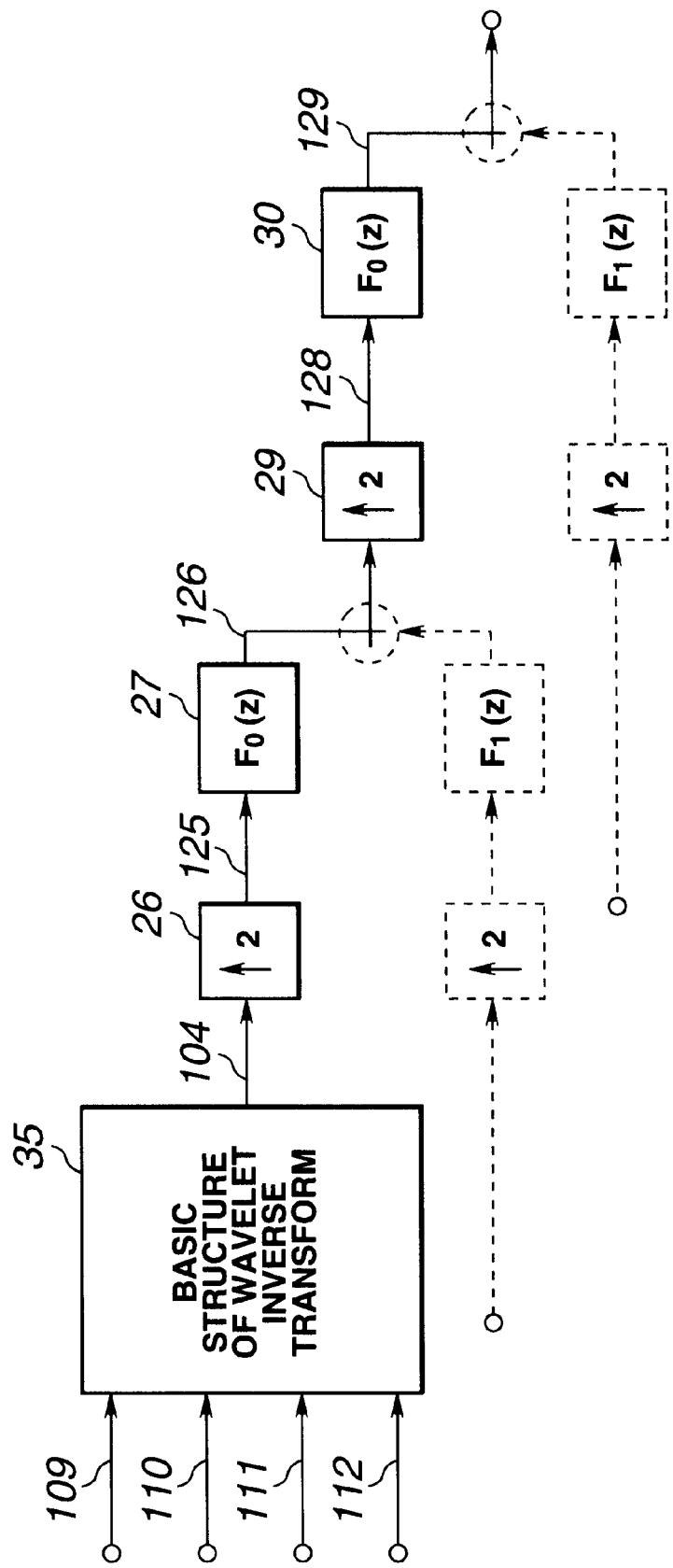
FIG. 11 is a block circuit diagram showing an inverse wavelet transform unit with resolution conversion with a factor equal to powers of 2, as, as a fifth embodiment.

FIG. 11 schematically shows, as the fifth embodiment, the structure of the inverse wavelet transform unit 4 in case of decoding with the resolution raised to a power of 2 by the wavelet decoding device of FIG. 1. In the structure of FIG. 11, the same constituent parts as those of FIG. 10 are denoted by the same reference numerals as those used in FIG. 10. The high-range side paths, indicated by broken lines in FIG. 11, represent omitted paths in the wavelet decoding device of the preferred embodiment, although these paths provided in the routine wavelet decoding device shown in FIG. 6.

In the inverse wavelet transform unit 4 of the present fifth embodiment, shown in FIG. 11, the inverse transformed decoded image signal 104, outputted by the basic inverse wavelet transform structure 35, is upsampled to twofold resolution by the doubling upsampler 26 and filtered by the low-pass filter for synthesis 27, to form a decoded image signal 126 of the double resolution.

This decoded image signal 126 is upsampled by a factor of two by a doubling upsampler 29 to produce a decoded image signal of the quadrupled resolution 128. The decoded image signal 128 then is filtered by a low-pass filter for synthesis 30 to produce a decoded image signal 129. This outputs a decoded image signal with quadrupled resolution.

If the decoded image signal 129 is passed through an upsampler and a synthesis filter, a decoded image signal with eightfold resolution is produced, although this is not shown in FIG. 11. Also, if the decoded image signal with this eightfold resolution is further passed through an upsampler and a synthesis filter, a decoded image signal with 16-tuple resolution. By repeating the processing of passing the decoded image signal through the upsampler and the synthesis filter, decoded image signals, the resolution of which is raised by a factor of powers of 2, are sequentially produced. The synthesis filter may be of the same basic structure. If the above-described configuration is to be realized by hardware, pipeline processing or time-divisional multiplexing may be used to simplify the hardware structure. If it is to be realized by software, filter coefficients, for example, may be used in common.

In the present fifth embodiment, the upsampler and the low-pass filter for synthesis are arranged only on the low frequency side, as shown in FIG. 11. However, if the high-range side signals of the path indicated by broken lines in FIG. 11 are available by some technique, it is possible to process the high-range side signals with upsampling and high-pass filtering for synthesis and to synthesize the resulting signals with the low-range side signals to generate decoded image signals.

Figure 12:
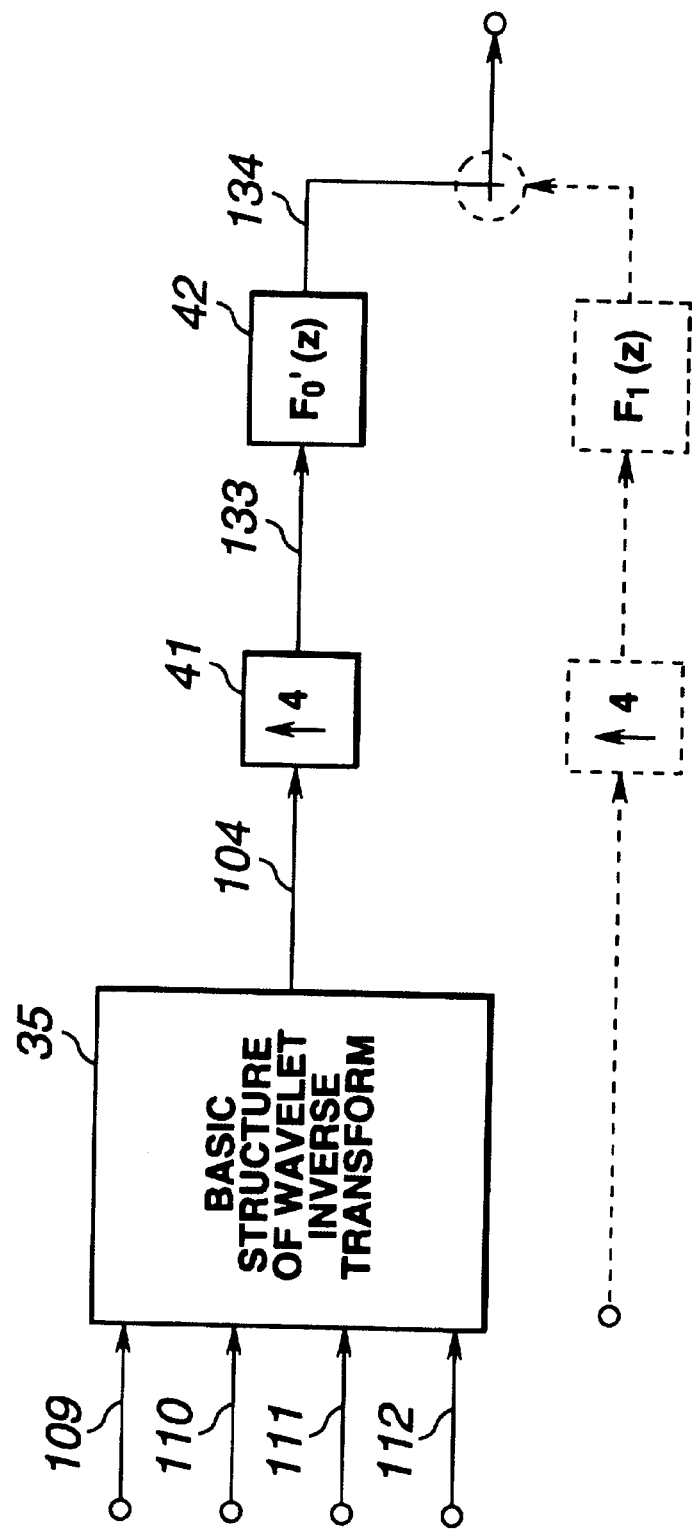
FIG. 12 is a block circuit diagram showing an inverse wavelet transform unit with quadrupled resolution conversion, as a sixth embodiment.

In the present fifth embodiment, the doubling upsampler and the low-pass filter for synthesis are paired and arranged in a multi-stage structure, as shown in FIG. 11. As a sixth embodiment, an upsampler for raising the resolution to a target resolution at a time, a quadrupling upsampler 41 in the case of FIG. 12, and an associated low-pass filter for synthesis 42, may be arranged, as shown for example in FIG. 12.

That is, in the present sixth embodiment of the inverse wavelet transform unit 4, shown in FIG. 2, the inverse transformed decoded image signal 104, outputted by the basic inverse wavelet transform structure 35, is upsampled to a quadruple resolution by the quadrupling upsampler 41, to generate an image signal 133, which is further filtered by the low-pass filter for synthesis 42 to generate a decoded image signal 134 of quadrupled resolution.

The structure of the present sixth embodiment may, of course, be applied to a resolution other than the quadruple resolution.

The low-pass filter for synthesis 27 of FIG. 10 uses a filter of the same characteristics as the low-pass filter for synthesis used in the basic inverse wavelet transform structure 35. On the other hand, if the fact that the processing on the downstream side of the basic inverse wavelet transform structure 35 is the filtering processing for enlarging the resolution is taken into consideration, it is possible to arrange a filter simpler in structure than the low-pass filter for synthesis within the inside of the basic inverse wavelet transform structure 35, such as a filter with a shorter tap length. In this case, the hardware cost (H/W cost) can be reduced with advantage.

A wavelet decoding device according to a seventh embodiment of the present invention is hereinafter explained.

In the specified embodiment of FIG. 7, the inverse wavelet transform unit 4 of the wavelet decoding device shown in FIG. 1 includes an upsampler and a synthesis filter in a multi-stage configuration on the downstream side of the basic inverse wavelet transform structure 35 to generate a decoded image of improved resolution. The wavelet decoding device also includes a downsampler in the ultimate stage to decimate the decoded image to furnish the ultimate decoded image.

Figure 13:
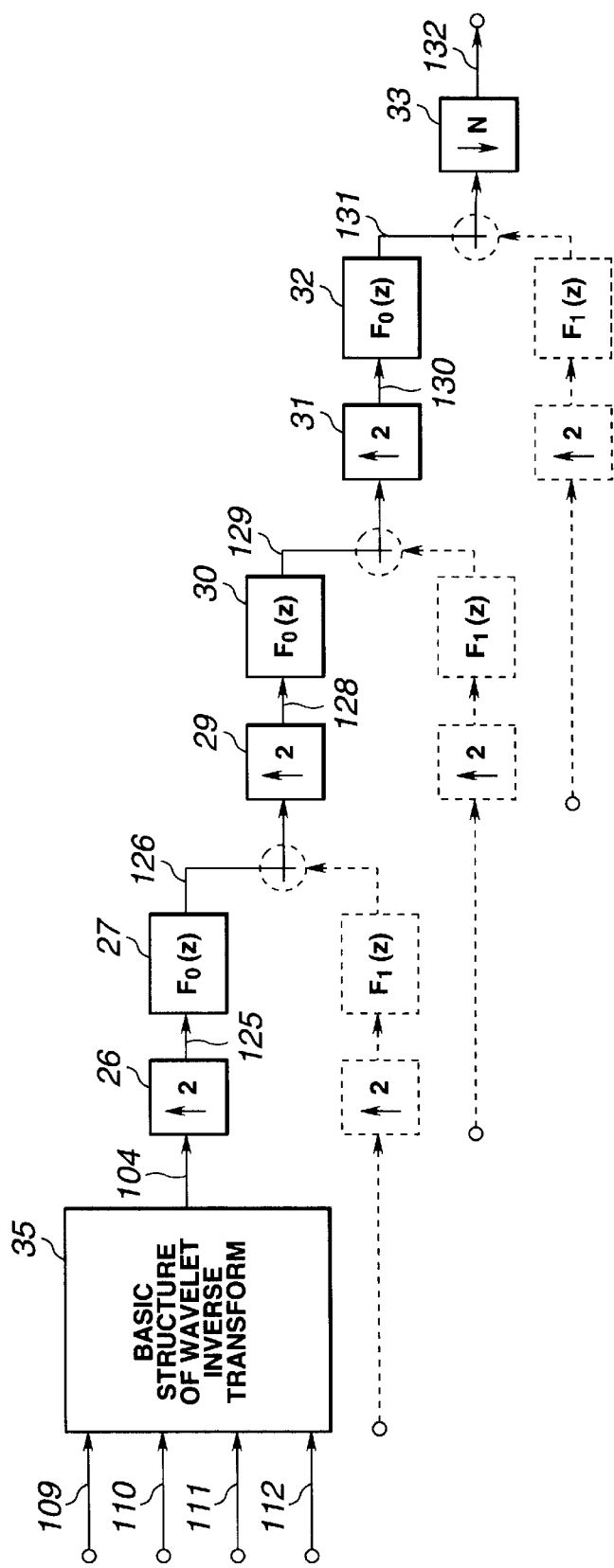
FIG. 13 is a block circuit diagram showing an inverse wavelet transform unit with resolution conversion with a factor equal to 8/N, as a seventh embodiment.

FIG. 13 schematically shows the structure of the wavelet decoding device 4 in case of decoding with a 8/N tuple resolution in the wavelet decoding device shown in FIG. 1. In the structure of FIG. 13, the same constituent parts as those of previous figures are denoted by the same reference numerals. The high-range side paths, indicated by broken lines in FIG. 11, represent omitted paths in the wavelet decoding device of the preferred embodiment, although these paths provided in the routine wavelet decoding device.

In the inverse wavelet transform unit 4 of the present seventh embodiment, shown in FIG. 13, the inverse transformed decoded image signal 104, outputted by the basic inverse wavelet transform structure 35, is upsampled to twofold resolution by the doubling upsampler 26 and filtered by the low-pass filter for synthesis 27, to form a decoded image signal 126 of the double resolution.

This decoded image signal 126 is upsampled by a factor of two by a doubling upsampler 29 to produce a decoded image signal of the quadrupled resolution 128. The decoded image signal 128 then is filtered by a low-pass filter for synthesis 30 to produce a decoded image signal 129. This outputs a decoded image signal with quadrupled resolution.

The decoded image signal 129 is passed through a doubling upsampler 31 to form a decoded image signal 130 with an eightfold resolution. The decoded image signal 130 is further filtered by a low-pass filter for synthesis 32 to produce a decoded image signal.

This decoded image signal 130 is decimated by a 1/N downsampler 33 in the ultimate stage. This outputs a decoded image signal 132 with a 8/N-resolution.

In the present seventh embodiment, the upsampler and the low-pass filter for synthesis are provided only in the signal path on the low range side of the image. On the other hand, if high-range signals of the path indicated by broken lines in the drawing are obtained by some technique or other, the high-range side signals can be passed through an upsampler and a high-pass filter for synthesis and the produced high-range side signals can be synthesized with the low-range side signals to generate decoded image signals. If this processing is constructed as multi-stage processing, an optional number of the pre-set enlarged images can be generated in desired manner.

In each low-pass filter for synthesis, shown in FIG. 13, filters of the same characteristics as those of the low-pass filter for synthesis, as a constituent element of the basic inverse wavelet transform structure 35, are used. On the other hand, if attention is directed to the fact that processing downstream of the basic inverse wavelet transform structure 35 is the resolution-raising filtering processing, it is possible to use a filter simpler than the low-pass filter for synthesis within the basic inverse wavelet transform structure 35, for example, a filter having a shorter tap length. This gives rise to a merit that the hardware cost can be reduced.

A wavelet decoding device according to an eighth embodiment of the present invention is hereinafter explained.

In the eighth embodiment, the inverse wavelet transform unit 4 of the wavelet decoding device shown in FIG. 1 converts the resolution of the inverse-transformed image, having a resolution higher than that of the image obtained with the pre-set resolution conversion factor, by the digital filter, downsampler and the upsampler, taken singly or in combination.

Figure 14:
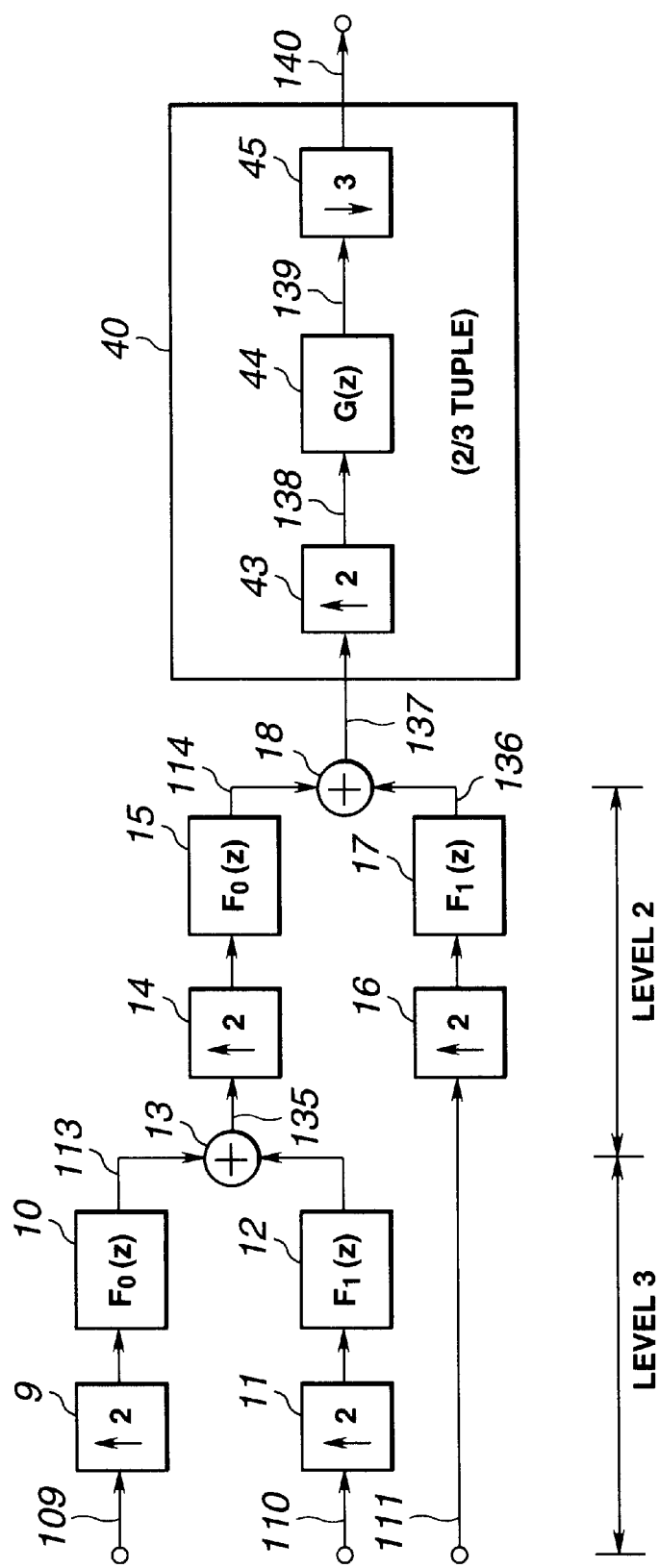
FIG. 14 is a block circuit diagram showing an inverse wavelet transform unit with resolution conversion with a factor equal to one-third, as an eighth embodiment.

FIG. 14 schematically shows the structure of the inverse wavelet transform unit 4 in case the resolution is contracted to one-third in the wavelet decoding device of FIG. 1 for decoding. In the structure of FIG. 14, the constituent elements which are the same as those of previous figures are depicted by the same reference numerals.

In the present eighth embodiment and in the second embodiment, the contraction ratio is one-third. As described above, the relation one-half reduction ratio>one-third reduction ratio>one-fourth reduction rato is exploited in the second embodiment so that, if only the one-third bandwidth component is needed, the band component of the H signal 112 producing the same resolution as the original image and the band component of the LH signal 111 producing the one-half resolution are both rendered unnecessary.

Figure 15:
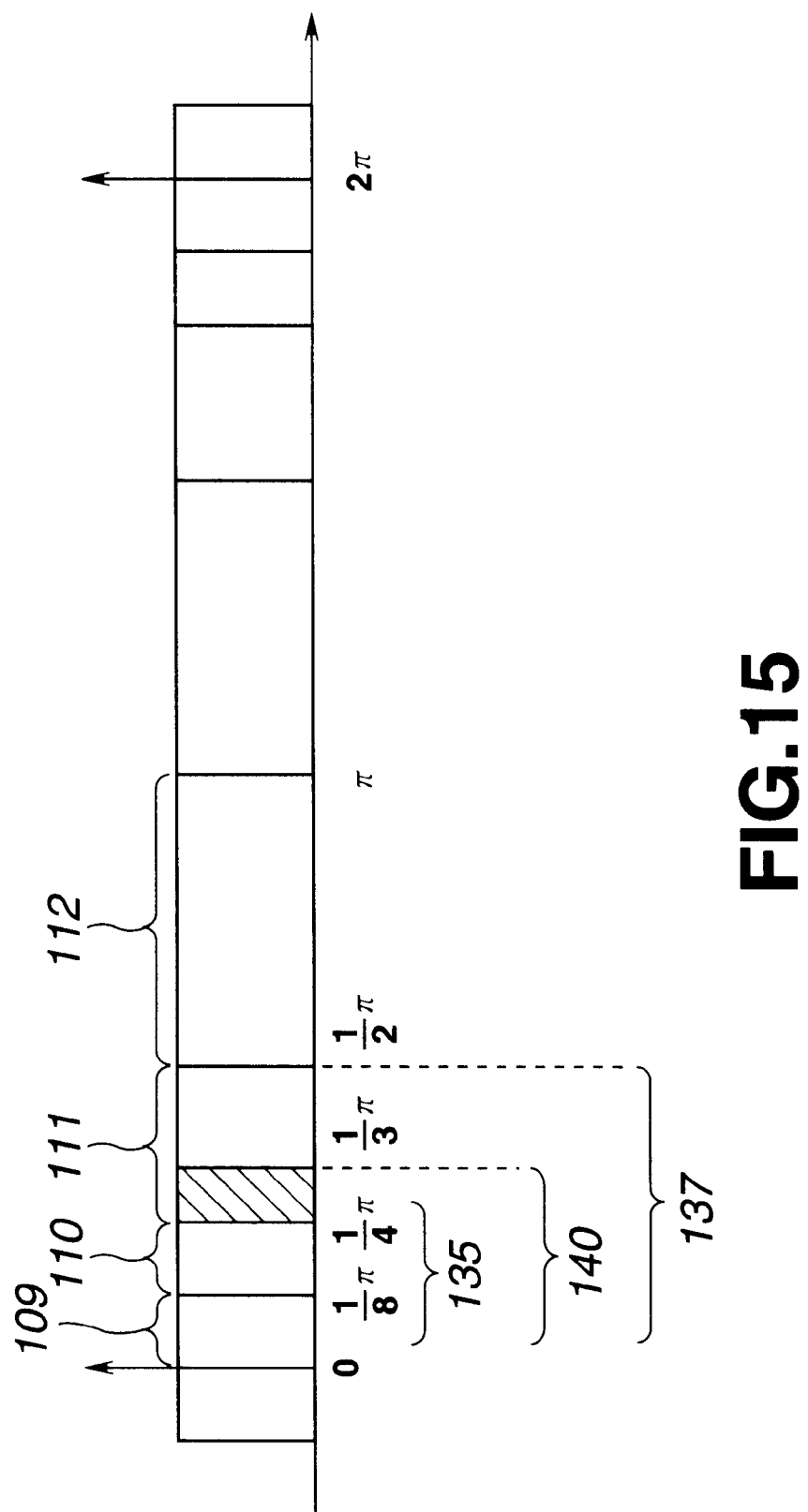
FIG. 15 shows a frequency band for a second embodiment.

However, as may be apparent from the frequency diagram shown in FIG. 15, since only the frequency band of $\pi/4$ is used in the second embodiment, restoration is inherently not possible with the use up to a band of $\pi/3$, thus causing the band loss of $\pi/3-\pi/4=\pi/12$, shown shaded in FIG. 15. This is detected as sharpness loss of a decoded image. FIG. 15 shows band splitting characteristics o the LLL signal 109, LLH signal 110, LH signal 111 and the H signal 112. Since the present invention is directed to digital signals, the frequency band becomes lower and higher as 0 and $2\pi$ are approached and as $\pi$ is approached, respectively, on the abscissa in FIG. 15.

In order to overcome this problem, a ⅔ tupling filter unit 40 is provided in the eighth embodiment to realize resolution conversion which is not susceptible to losses.

That is, in the inverse wavelet transform 4 of the eighth embodiment, shown in FIG. 14, the LLL signal 109 and the LLH signal 110 are upsampled to a double resolution by the upsamplers 9, 11, respectively, and filtered by the associated low-pass filter for synthesis 10 and the high-pass filter for synthesis 12, respectively, so as to be then band-synthesized by the adder 13. The above processing completes the level 3 inverse transform.

The signal 135 from the adder 13 and the LH signal 111 are upsampled to a double resolution by the upsamplers 14, 16, respectively, and filtered by associated low-pass filter for synthesis 15 and the high-pass filter for synthesis 17, respectively, so as to be then band-synthesized by the adder 13. The above processing completes the level 2 inverse transform. The frequency band of the signal 137 outputted by the adder 18 corresponds to $\pi/2$, as shown in FIG. 15. The signal 137 outputted by the adder 18 is sent to a ⅔ tupling filter unit 40.

The ⅔ tupling filter unit 40 first upsamples the signal 137 to give a double-resolution signal 138, which then is filtered by a digital filter 44 corresponding to the ⅔ tuple resolution conversion.

The filtered signal 139, obtained by the filtering by the digital filter 44, is downsampled (decimated) to a one-third resolution by the downsampler 45. An output signal of the downsampler 45 is outputted as a decoded picture signal 140 having the resolution lowered to one-third.

The specified structure and operation of the digital filter 44 is now explained in detail.

A digital filter usually has plural filter coefficients (impulse response). The coefficient length is termed a tap length, with a group of filter coefficients being termed a transfer function. Therefore, characteristics of a digital filter are generally determined by how this transfer function is determined. However, with the digital filter targeted by the present invention, in which resolution conversion is executed with a factor of an optional rational number including a non-integer number, the noise such as ringing or chess distortion is likely to be produced. Therefore, the transfer function free of this inconvenience needs to be set.

It is assumed that the transfer function of the digital filter 44 is G(z) and is expressed, by the transfer function $G_U(z)$ for upsampling and from the transfer function $G_D(z)$ for downsampling, in accordance with the following equation (1):

$$G(z) = G_u(z) \times G_D(z) \quad (1).$$

The form of the equation (1) is used if U<D, it being assumed that the resolution transform factor is U/D.

The transfer functions constituting the equation (1) are given by the following equations (2) and (3):

$$G_U(z) = 1 + z^{-1} + z^{-2} + z^{-3} + \ldots + z^{-(U-1)} \quad (2)$$

$$G_D(z) = (1 + z^{-1} + z^{-2} + z^{-3} + \ldots + z^{-(D-1)})/D \quad (3).$$

From the foregoing, the post-inverse-transform signal 137 can be resolution-converted to a ⅔ tuple resolution by the ⅔ tupling filter unit 40.

In the eighth embodiment, the image from inverse transform with a one-half resolution, larger than and closest to the resolution conversion factor of one-third, is resolution-converted to two/third tuple resolution. Obviously, resolution conversion to one third resolution can be achieved from the decoded image signal 104, which is the complete inverse-transform reconstructed image. However, from the viewpoint of saving in the computational processing, it is desirable that the inverse-transformed image, prior to resolution conversion, is larger than the image obtained by the pre-set resolution conversion factor, and is obtained on inverse transform with a factor closest to the pre-set resolution conversion factor.

The structure of the eighth embodiment has a merit that redundancy is eliminated. Specifically, in resolution conversion by a factor of U/D, an image with the U-tuple resolution is generated as an intermediate image which is resolution-converted by 1/D to produce an ultimate U/D tuple image. In such case, a vast memory for storage of a U-tuple image is required. However, in the present eighth embodiment, redundancy can be completely eliminated by providing a digital filter in meeting with the resolution conversion factor equal to U/D.

A wavelet decoding device according to a ninth embodiment of the present invention is hereinafter explained.

In the ninth embodiment, the inverse wavelet transform unit 4 of the wavelet decoding device shown in FIG. 1 converts the resolution of the inverse-transformed image, having a resolution larger than that of the image obtained with the pre-set resolution conversion factor, by the digital filter, downsampler and the upsampler, taken singly or in combination.

Figure 16:
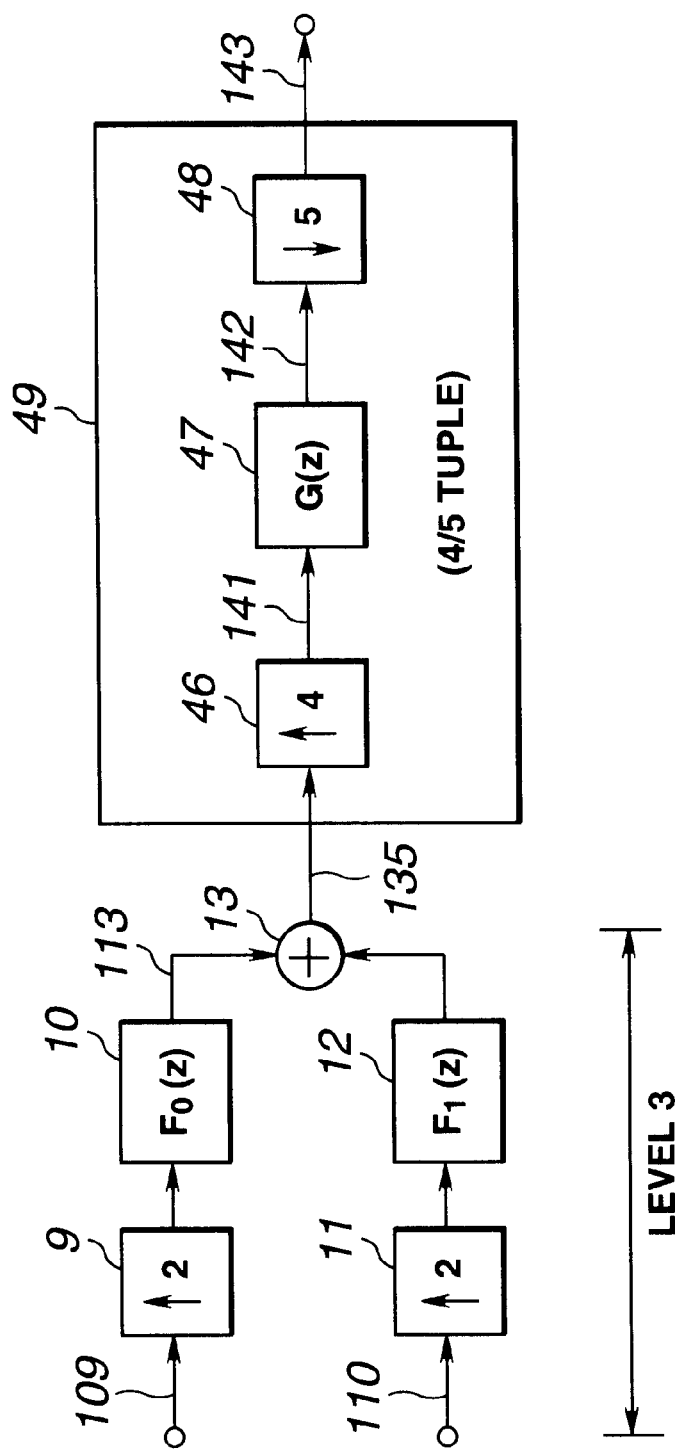
FIG. 16 is a block circuit diagram showing the structure of an inverse wavelet transform unit with resolution conversion with a factor equal to one-fifth, as a ninth embodiment.

FIG. 16 schematically shows the structure of the inverse wavelet transform unit 4 in case the resolution is contracted to one-fifth in the wavelet decoding device of FIG. 1 for decoding. In the structure of FIG. 16, the constituent elements which are the same as those of previous figures are depicted by the same reference numerals.

In the present ninth embodiment and in the third embodiment, the contraction ratio is one-third. As described above, the relation one-fourth reduction ratio>one-fifth reduction ratio>one-eighth reduction ratio is exploited in the third embodiment so that, if only the one-fifth bandwidth component is needed, the band component of the H signal 112 producing the same resolution as that of the original image, the band component of the LH signal 111 producing the one-half resolution and the band component of the LH signal 110 producing the one-fourth resolution are rendered unnecessary.

Figure 17:
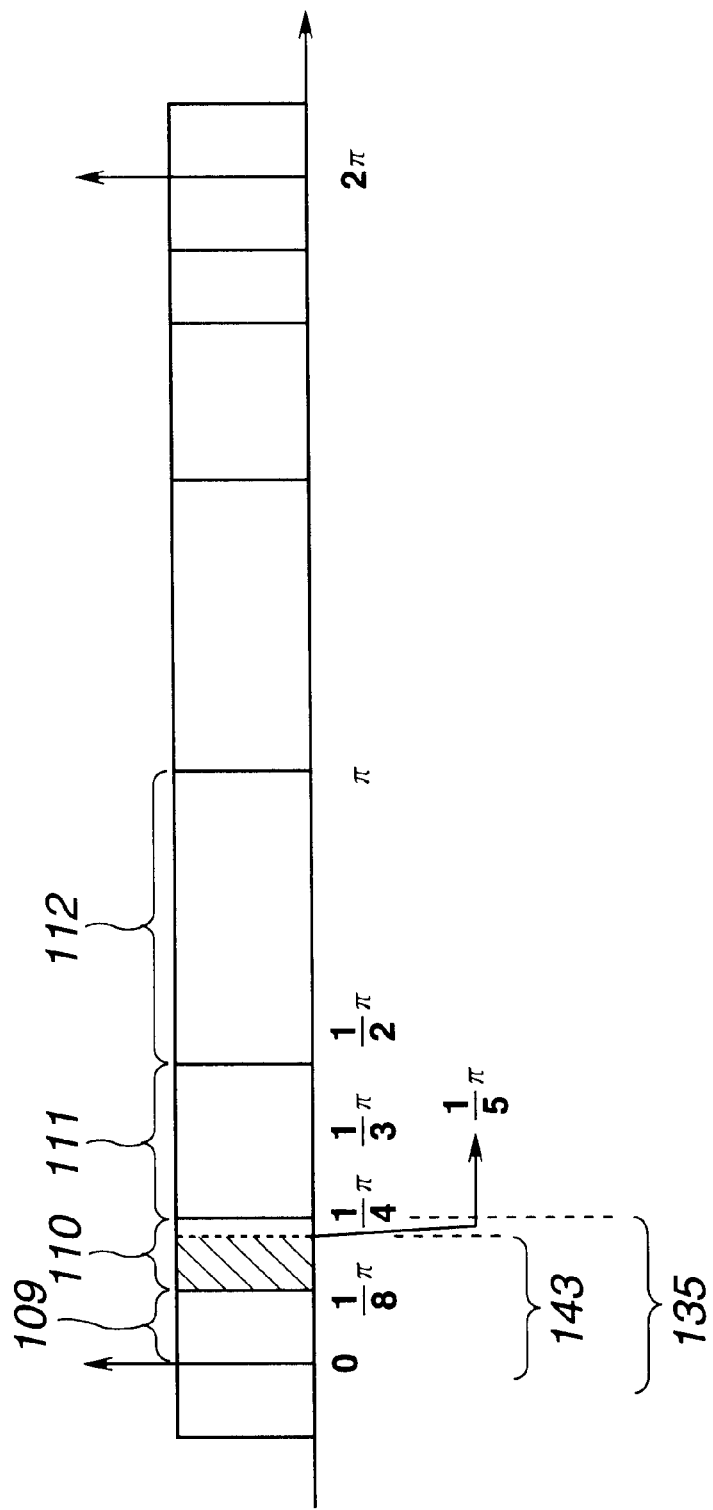
FIG. 17 shows a frequency band for a third embodiment.

However, as may be apparent from the frequency diagram shown in FIG. 17, since only the frequency band of π/8 is used in the third embodiment, restoration is inherently not possible with the use up to a band of π/5 to cause the band loss of π/5−π/8=3π/40, shown shaded in FIG. 17. This is detected as sharpness loss of a decoded image.

Thus, in order to overcome this problem, a ⅘ tupling filter unit 49 is provided in the ninth embodiment to realize resolution conversion which is not susceptible to losses.

In the inverse wavelet transform unit 4 of the ninth embodiment, shown in FIG. 16, the LLL signal 109 and the LLH signal 110 are upsampled to a double resolution by the upsamplers 9, 11, and are filtered by the low-pass filter for synthesis 10 and the high-pass filter for synthesis 12, respectively, so as to be then band-synthesized by the adder 13. By this processing, a signal corresponding to the one-fourth resolution is produced. Meanwhile, the frequency band proper to the output signal 135 of the adder 13 corresponds to π/4, as shown in FIG. 17. The output signal 135 of the adder 13 is routed to the ⅘ tupling filter 49.

The ⅘ tupling filter 49 upsamples the signal 135 to a quadruple resolution by the upsampler 46. The signal 141 upsampled by the upsampler 46 is filtered by a digital filter 47 associated with the ⅘ tuple resolution conversion.

The filtered signal 142, obtained by the filtering by the digital filter 47, is downsampled (decimated) to a one-fifth resolution by the downsampler 48. An output signal of the downsampler 48 is outputted as a decoded picture signal 143 having the resolution lowered to four-fifth.

It suffices if the transfer function of the digital filter 47 is calculated in accordance with the equations (1), (2) and (3). It is noted however that, in the present ninth embodiment, U=4 and D=5, so that U<D.

A wavelet decoding device according to a tenth embodiment of the present invention is hereinafter explained.

In the tenth embodiment, the inverse wavelet transform unit 4 of the wavelet decoding device shown in FIG. 1 converts the resolution of the inverse-transformed image, having a resolution larger than that of the image obtained with the pre-set resolution conversion factor, by the digital filter, downsampler and the upsampler, taken singly or in combination.

Figure 18:
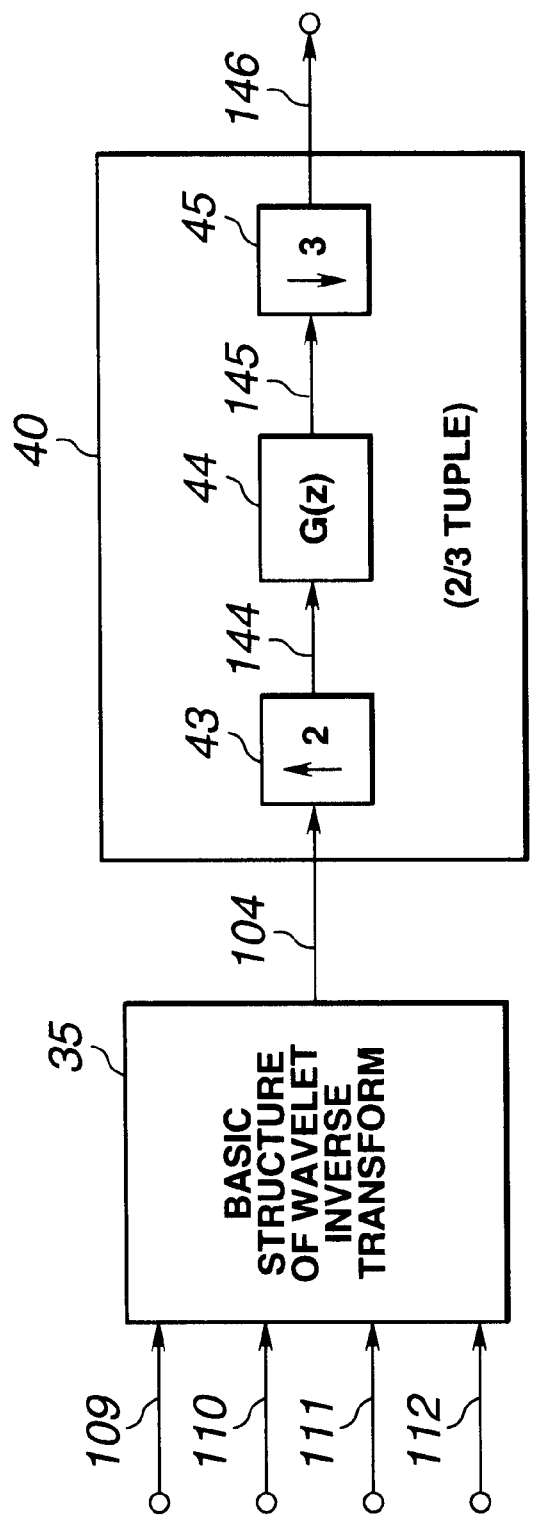
FIG. 18 is a block circuit diagram showing the structure of an inverse wavelet transform unit with resolution conversion with a factor equal to two-thirds, as a tenth embodiment.

FIG. 18 schematically shows the structure of the inverse wavelet transform unit 4 in case the resolution is contracted to two-thirds in the wavelet decoding device of FIG. 1 for decoding. In the structure of FIG. 18, the constituent elements which are the same as those of previous figures are depicted by the same reference numerals.

In the two-third tuple filter 40, shown in FIG. 18, the inverse-transformed decoded image signals 104, are outputted by the basic inverse wavelet transform structure 35, and are sent to the ⅔ tuple filter unit 40 constructed similarly to the filer unit shown in FIG. 14.

The ⅔ tuple filter unit 40 upsamples the decoded image signals 104, finally inverse-transformed and re-constructed by the basic inverse wavelet transform structure 35, to a double resolution, to give upsampled double resolution signal 144, and filters the signal 144 by the digital filter associated with the ⅔ tuple resolution conversion to give a filtered signal 145. This filtered signal 145 from the digital filter 44 is downsampled (decimated) to a one-third tuple resolution by the downsampler 45 and outputted as a decoded image signal 146 lowered to a two-third tuple resolution.

A wavelet decoding device according to an eleventh embodiment of the present invention is hereinafter explained.

In the eleventh embodiment, the inverse wavelet transform unit 4 of the wavelet decoding device shown in FIG. 1 converts the resolution of the inverse-transformed image, having a resolution larger than that of the image obtained with the pre-set resolution conversion factor, by the digital filter, downsampler and the upsampler, taken singly or in combination.

Figure 19:
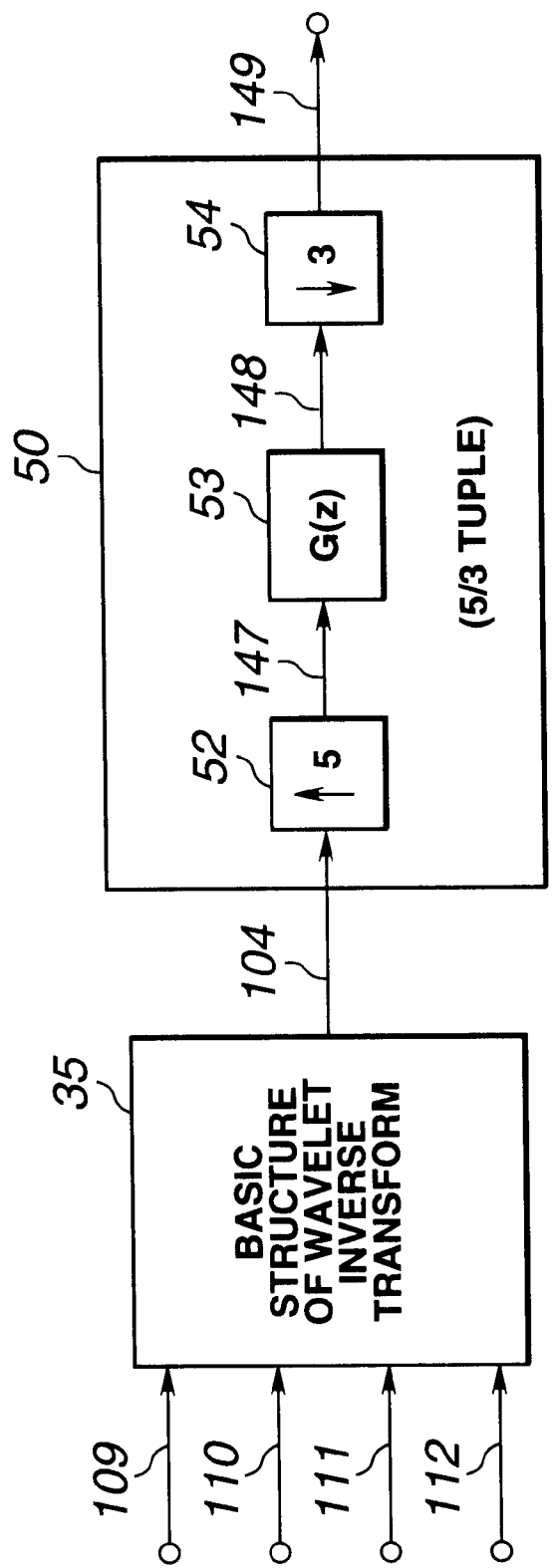
FIG. 19 is a block circuit diagram showing the structure of an inverse wavelet transform unit with resolution conversion with a factor equal to five-thirds, as an eleventh embodiment.

FIG. 19 schematically shows the structure of the inverse wavelet transform unit 4 in case the resolution is raised to ⅝ tuple in the wavelet decoding device of FIG. 1 for decoding. In the structure of FIG. 19, the constituent elements which are the same as those of previous figures are depicted by the same reference numerals.

In the inverse wavelet transform unit 4 of the eleventh embodiment, shown in FIG. 19, the inverse-transformed decoded image signals 104, outputted by the basic inverse wavelet transform structure 35, are sent to the ⅝ tuple filter unit 50.

The ⅝ tuple filter unit 50 upsamples the decoded image signals 104, finally inverse-transformed and re-constructed by the basic inverse wavelet transform structure 35, by a five-fold resolution, to give an upsampled double resolution signal 147, and filters the signal 147 by a digital filter 53 associated with the ⅝ tuple resolution conversion to give a filtered signal 148. This filtered signal 148 from the digital filter 53 is downsampled (decimated) to a ⅓ tuple resolution by the downsampler 54 and outputted as a decoded image signal 149 lowered to a ⅝ tuple resolution.

The transfer function of the digital filter 53, used on the eleventh embodiment, is hereinafter explained.

In this eleventh embodiment, U>D, so that the transfer function of the equation (2) or (3) explained in the eighth embodiment cannot be used as the transfer function of the digital filter 53. Therefore, in the eleventh embodiment, the structure shown by the following equation (4):

$$G(z) = G_U(z) \times G_U(z^{-1})/U \qquad (4)$$

is used. This means that the transfer function is represented by the multiplication of transfer functions of pixel repetition (also termed zeroth order hold).

In the above equation (4), $G_U(z)$ is expressed by the following equations (5) and (6):

$$G_U(z) = 1 + z^{-1} + z^{-2} + z^{-3} + \ldots + z^{-(U-1)} \qquad (5)$$

$$G_U(z^{-1}) = (1 + z + z^2 + z^3 + \ldots + z^{-(U-1)} \qquad (6).$$

The result of the equation (4) means linear interpolation. The reason is that, if U=2, $$G(z) = (1+z)(1+z^{-1})/2 = (z+2+z^{-1})/2$$

which obviously indicates linear interpolation because the number of orders of filters is three and the coefficient is (½, 1 and ½). Obviously, similar results are obtained if U is other than 2.

In the preferred embodiment, it is possible to decode the band-split image, generated in the course of the inverse wavelet transform by the decoder, at a resolution factor equal to an optional rational number. Stated differently, it is possible in the preferred embodiment to realize wavelet decoding with resolution conversion heretofore possible only with the resolution equal to powers of 2. Therefore, a image converted in the resolution factor equal to the optional rational number can be stored and displayed on, for example, an electronic still camera or a printer, without being affected by constraint conditions on the terminal side, to render it possible to enlarge the application to a variety of products.

In the case of, for example, reducing the resolution factor, the high-frequency components lower than that given by the reduction ratio may be omitted from the decoding process to diminish the computation al volume. Also, since aliasing can be prevented from occurring by high range shutout, thus producing a high-quality decoded image.

In the case of enlarging the resolution factor, wavelet decoding with resolution factor conversion may be achieved by providing a basic inverse wavelet transform structure, and by providing an upsampler, a low-pass filter for synthesis and a downsampler on its downstream side, depending on the pre-set resolution conversion factor. Also, the computational cost and the hardware cost can be reduced, as the image quality of the decoded image is maintained, by arranging the low-pass filter for synthesis simpler in structure than the basic inverse wavelet transform structure.

As a feature common to all of the embodiments of the present invention, there are no limiting conditions on the wvelet encoding device. There is alos accrued a meritorious effect that a wavelet decoded image with resolution conversion of a factor equal to an optional rational number can be obtained by inputting the encoded bitstream generated by the commonplace wavelet transform and wavelet encoding device.

Also, in the preferred embodiment, an image decoded by inverse wavelet transform up to the number of levels larger than the targeted resolution factor is processed by the upsampler, digital filter and the downsampler, to generate a pre-set resolution-converted image, and hence the redundancy is removed, the hardware scale or the computational volume can advantageously be reduced.

What is claimed is:

1. A wavelet decoding device comprising:
   entropy decoding means for entropy decoding an encoded bitstream to transmit quantized coefficients;
   dequantizing means for dequantizing said quantized coefficients to transmit transform coefficients;
   transform coefficient back-scanning means for scanning said transform coefficients in a pre-set fashion to re-array the transform coefficients; and
   inverse wavelet transform means for inverse transforming only the low-frequency components of said re-arrayed transformation coefficients to furnish a decoded image, thereby lowering the resolution of the transform operation; said inverse wavelet transform means adaptively constituting an upsampler, a downsampler and a synthesis filter to generate a resolution-converted image in dependence upon a pre-set resolution conversion factor having any rational number.

2. The wavelet decoding device according to claim 1, wherein the resolution of the transformed low-frequency components is greater than the resolution required by said pre-set resolution conversion factor.

3. The wavelet decoding device according to claim 1 wherein a downsampler is arranged on the last stage to decimate a decoded image to produce a final decoded image.

4. The wavelet decoding device according to claim 1 wherein an upsampler and a synthesis filter are arranged on a downstream side to generate a resolution-converted image and wherein a downsampler is arranged on the last stage on the further downstream side to decimate a decoded image to produce a final decoded image.

5. The wavelet decoding device according to claim 4 wherein said upsampler raises the longitudinal or transverse resolution by a factor of two.

6. The wavelet decoding device according to claim 4 wherein said upsampler and the synthesis filter are arranged as a set.

7. The wavelet decoding device according to claim 1 wherein upsamplers and synthesis filters are arranged in multiple stages on the downstream side.

8. The wavelet decoding device according to claim 7 wherein said upsamplers and synthesis filters are arranged only on the low range side of the image.

9. The wavelet decoding device according to claim 7 wherein said upsampler raises the resolution in the longitudinal and transverse directions by a factor of two.

10. The wavelet decoding device according to claim 7 wherein said synthesis filter is the same as the synthesis filter used in the upstream side.

11. The wavelet decoding device according to claim 7 wherein said synthesis filter differs from the synthesis filter used in the upstream side.

12. The wavelet decoding device according to claim 7 wherein a downsampler is provided in the last stage.

13. The wavelet decoding device according to claim 1 wherein said upsampler and the downsampler are digital filters.

14. A wavelet decoding method comprising:
   entropy decoding an encoded bitstream to transmit quantized coefficients;
   dequantizing said quantized coefficients to transmit transform coefficients;
   scanning said transform coefficients in a pre-set fashion to re-array the transform coefficients; and
   inverse transforming only the low-frequency components of said re-arrayed transformation coefficients to furnish a decoded image, thereby lowering the resolution of the transform operation; wherein said inverse wavelet transform, upsampling, downsampling and synthesis filtering to generate a resolution-converted image are adaptively carried out in dependence upon a pre-set resolution conversion factor having any rational number.

15. The wavelet decoding method according to claim 14, wherein the resolution of the transformed low-frequency components is greater than the resolution required by said pre-set resolution conversion factor.

16. The wavelet decoding method according to claim 14 wherein downsampling is effected in the last stage to decimate the decoded image to furnish a finally decoded image.

17. The wavelet decoding method according to claim 14 wherein upsampling and synthesis filtering are effected on the downstream side to generate a resolution-converted image and wherein downsampling is effected in the last stage on the further downstream side to decimate a decoded image to furnish the final decoded image.

18. The wavelet decoding method according to claim 17 said upsampling raises the resolution in the longitudinal or transverse direction by a factor of two.

19. The wavelet decoding method according to claim 17 said upsampling and the synthesis filtering form a set.

20. The wavelet decoding method according to claim 14 wherein
   said upsampling and synthesis filtering are effected in plural stages on the downstream side.

21. The wavelet decoding method according to claim 20 wherein
   said upsampling and synthesis filtering are effected only on low-frequency components of an image.

22. The wavelet decoding method according to claim 20 wherein
   said upsampling raises the resolution in the longitudinal or transverse direction by a factor of two.

23. The wavelet decoding method according to claim 20 wherein
   said synthesis filtering is the same as that performed on the upstream side.

24. The wavelet decoding method according to claim 20 wherein
   said synthesis filtering differs from that performed on the upstream side.

25. The wavelet decoding method according to claim 20 wherein
   downsampling is effected in the last stage.

26. The wavelet decoding method according to claim 14 wherein
   said upsampling and downsampling are digital filtering processing.

* * * * *